United States Patent
Strickler et al.

[19]

[11] Patent Number: 6,122,630
[45] Date of Patent: Sep. 19, 2000

[54] BIDIRECTIONAL DATABASE REPLICATION SCHEME FOR CONTROLLING PING-PONGING

[75] Inventors: Gary E. Strickler, Pottstown; Herbert William Knapp, Wayne; Bruce D. Holenstein, Media; Paul J. Holenstein, Downington, all of Pa.

[73] Assignee: ITI, Inc., Paoli, Pa.

[21] Appl. No.: 09/328,257

[22] Filed: Jun. 8, 1999

[51] Int. Cl.[7] ............................. G06F 17/30; G06F 7/00
[52] U.S. Cl. ............................. 707/8; 707/10; 709/238
[58] Field of Search .......................... 707/8, 1, 9, 10, 707/104, 201, 203, 204, 202; 709/208, 230, 232, 238; 714/1, 15, 20

[56] References Cited

U.S. PATENT DOCUMENTS

| | | |
|---|---|---|
| 5,036,518 | 7/1991 | Tseung ........................................ 371/32 |
| 5,276,871 | 1/1994 | Howarth . |
| 5,579,318 | 11/1996 | Reuss et al. . |
| 5,615,364 | 3/1997 | Marks . |
| 5,680,573 | 10/1997 | Rubin et al. . |
| 5,710,922 | 1/1998 | Alley et al. . |
| 5,721,915 | 2/1998 | Sockut et al. . |
| 5,721,916 | 2/1998 | Pardikar . |
| 5,721,918 | 2/1998 | Nilsson et al. . |
| 5,737,601 | 4/1998 | Jain et al. . |
| 5,740,433 | 4/1998 | Carr et al. . |
| 5,745,753 | 4/1998 | Mosher, Jr. . |
| 5,757,669 | 5/1998 | Christie et al. . |
| 5,758,150 | 5/1998 | Bell et al. . |
| 5,781,910 | 7/1998 | Gostanian et al. . |
| 5,794,252 | 8/1998 | Bailey et al. . |
| 5,799,306 | 8/1998 | Sun et al. . |
| 5,799,322 | 8/1998 | Mosher, Jr. . |
| 5,799,323 | 8/1998 | Mosher, Jr. et al. . |
| 5,806,075 | 9/1998 | Jain et al. . |
| 5,832,203 | 11/1998 | Putzolu et al. . |
| 5,835,915 | 11/1998 | Carr et al. . |
| 5,884,325 | 3/1999 | Bauer et al. . |
| 5,884,328 | 3/1999 | Mosher, Jr. . |
| 5,924,096 | 7/1999 | Draper et al. . |
| 5,970,488 | 10/1999 | Crowe et al. .............................. 707/8 |
| 5,991,771 | 11/1999 | Falls et al. ............................. 707/202 |
| 6,012,059 | 7/1991 | Neimat et al. .............................. 707/8 |

OTHER PUBLICATIONS

Bodin et al, "Evaluating Two Loop Transformations for Reducing Multiple Writer False Sharing", 7th Annual Workshop on Languages and Compiler for Parallel Computing, New York, Aug. 1994.

*Primary Examiner*—Thomas G. Black
*Assistant Examiner*—Uyen Le
*Attorney, Agent, or Firm*—Akin, Gump, Strauss, Hauer & Feld, L.L.P.

[57] ABSTRACT

Transaction ping-pong is selectively prevented in a bidirectional database replication system. The system has a plurality of nodes connected via communication media in a topology. Each node includes a database and a transaction transmitter or collector which sends transactions posted to the database to a database at one or more other nodes for replication in the databases of the one or more other nodes. All transactions to be posted to databases in remote nodes that were sent by a local node are detected, and the database at the local node is inhibited from posting selective transactions which were detected as being originally sent by the local node.

99 Claims, 18 Drawing Sheets

AUDIT TRAIL B

| TIME | HEADER | | DATA |
|------|--------|--------|------|
| | TRANID | TABLE | |
| $t_1$ | 101x | | BEGIN TRANSACTION 101 |
| $t_2$ | 101x | ACCOUNTS | SMITH, JOHN, DEBIT $10.00 |
| $t_3$ | 101x | ACCOUNTS | DOE, JANE, CREDIT $10.00 |
| $t_4$ | 101x | | COMMIT TRANSACTION 101 |
| $t_5$ | 102y | | BEGIN TRANSACTION 102 |
| $t_6$ | 102y | ACCOUNTS | JONES, WILLIAM, DEBIT $40.00 |
| $t_7$ | 103x | | BEGIN TRANSACTION 103 |
| $t_8$ | 107− | | BEGIN TRANSACTION 107 |
| ⋮ | | | |
| $t_n$ | | | | x = PROCESSOR $B_{CON}$ y = PROCESSOR ASSOCIATED WITH LOCAL INPUT DEVICE B

− = NO PROCESSOR ID (NOT PROCESSOR $B_{CON}$)

*Fig. 8a*

AUDIT TRAIL B

| TIME | HEADER | | DATA |
|---|---|---|---|
| | TRANID | TABLE | |
| $t_1$ | 101$CONB | | BEGIN TRANSACTION 101 |
| $t_2$ | 101$CONB | ACCOUNTS | SMITH, JOHN, DEBIT $10.00 |
| $t_3$ | 101$CONB | ACCOUNTS | DOE, JANE, CREDIT $10.00 |
| $t_4$ | 101$CONB | | COMMIT TRANSACTION 101 |
| $t_5$ | 102$APP1 | | BEGIN TRANSACTION 102 |
| $t_6$ | 102$APP1 | ACCOUNTS | JONES, WILLIAM, DEBIT $40.00 |
| $t_7$ | 103$CONB | | BEGIN TRANSACTION 103 |
| $t_8$ | 107$APP1 | | BEGIN TRANSACTION 107 |
| ⋮ | | | |
| $t_n$ | | | |

$CONB = NAME OF PROCESS RUNNING AS CONSUMER B $APP1 = NAME OF PROCESS (e.g. APPLICATION PROGRAM) RUNNING IN LOCAL INPUT DEVICE B

*Fig. 8b*

AUDIT TRAIL B₁
(CONSUMER B TRANSACTIONS)

90

| TIME | HEADER | | DATA |
|------|--------|-------|------|
|      | TRANID | TABLE |      |
| $t_1$ | 101 |          | BEGIN TRANSACTION 101 |
| $t_2$ | 101 | ACCOUNTS | SMITH, JOHN, DEBIT $10.00 |
| $t_3$ | 101 | ACCOUNTS | DOE, JANE, CREDIT $10.00 |
| $t_4$ | 101 | ACCOUNTS | COMMIT TRANSACTION 101 |
| ⋮ |   |   |   |
| $t_n$ |   |   |   |

AUDIT TRAIL B₂
(LOCAL B TRANSACTIONS)

92

| TIME | HEADER | | DATA |
|------|--------|-------|------|
|      | TRANID | TABLE |      |
| $t_5$ | 102 |          | BEGIN TRANSACTION 102 |
| $t_6$ | 103 |          | BEGIN TRANSACTION 103 |
| ⋮ |   |   |   |
| $t_{12}$ | 102 | ACCOUNTS | JONES, WILLIAM, DEBIT $40.00 |
| ⋮ |   |   |   |
| $t_n$ |   |   |   |

*Fig. 10a*

AUDIT TRAIL B

CONSUMER B TRANSACTIONS

| TIME | HEADER | | DATA |
|---|---|---|---|
| | TRANID | TABLE | |
| $t_1$ | 101 | | BEGIN TRANSACTION 101 |
| $t_2$ | 101 | ACCOUNTS | SMITH, JOHN, DEBIT $10.00 |
| $t_3$ | 101 | ACCOUNTS | DOE, JANE, CREDIT $10.00 |
| $t_4$ | 101 | | COMMIT TRANSACTION 101 |
| ⋮ | | | |
| $t_n$ | | | |

LOCAL B TRANSACTIONS

| TIME | HEADER | | DATA |
|---|---|---|---|
| | TRANID | TABLE | |
| $t_5$ | 102 | | BEGIN TRANSACTION 102 |
| $t_6$ | 103 | | BEGIN TRANSACTION 103 |
| ⋮ | | | |
| $t_{12}$ | 102 | ACCOUNTS | JONES, WILLIAM, DEBIT $40.00 |
| ⋮ | | | |
| $t_n$ | | | |

*Fig. 10b*

TRANLOG

| TIME | LOCAL TRANID | REMOTE SOURCE TRANID |
|------|--------------|----------------------|
| $t_1$ | 101 | 201 |
| $t_2$ | 102 | 202 |
| $t_3$ | | |
| $t_4$ | 105 | ~~202~~ |
| $t_5$ | 106 | 203 |

RESTART → $t_3$

DUPLICATE NUMBER (DO NOT POST)

*Fig. 17*

BIDIRECTIONAL DATABASE REPLICATION SCHEME FOR CONTROLLING PING-PONGING

BACKGROUND OF THE INVENTION

The present invention relates to the field of data replication. "Bidirectional Database Replication" is specified as the application of database deltas (i.e., the results of transactions being performed against a database) from either of two databases in a pair to the other one. Transaction I/O (e.g., inserts, updates, and deletes) applied to one database are applied to the other database and vice versa. Both databases are "live" and are receiving transactions from applications and/or end users. "Bidirectional Database Replication" presents itself in two ways—"bidirectional homogeneous database replication" and "bidirectional heterogeneous replication." In homogeneous database replication, the two databases in the pair are identical. In heterogeneous replication, while there must necessarily be some commonality between the two databases in the data they contain, there are differences in the databases. For example, the databases may be of the same commercial brand but have differing physical and logical structures, or the databases may be essentially identical but be of different commercial brands.

The typical purpose of "Bidirectional Homogeneous Database Replication" is to provide a higher degree of fault tolerance than can be provided through conventional unidirectional database replication from a production database to a backup database ("hot backup replication"). In traditional hot backup replication, database deltas are captured from the production database and are applied to a backup database that is usually located remotely. In the event of a failure of the primary system, the applications on the backup system must be started and the end users must be routed to the backup database. In the best implementations, this process takes several minutes. Furthermore, assuming the failure of the primary system was not caused by a severe catastrophe, the computer operators must be moved from the production location to the backup location. For example, in severe natural disasters or terrorist incidents, it may not be possible to transport the computer operators to the backup site. In typical "Bidirectional Homogeneous Database Replication," both databases (and both sites if they are remote from one another) are live at all times. All applications are running on both databases, end users are already enabled to perform transactions on either database, and each data center is fully staffed. In the event of a failure of one of the two databases, all processing is performed on the remaining live database. No downtime of the application is endured.

The typical purpose of "Bidirectional Heterogeneous Database Replication" is to allow heterogeneous computer systems and databases to share data in one enterprise with minimal impact on the production processing occurring on either system. Traditional Open Database Connectivity solutions for this problem allow applications or end users on one system to run queries against the databases on the other systems. This causes massive read activity on the other system that hampers production transaction processing. "Bidirectional Heterogeneous Database Replication," however, uses very little system resources on either system. Changes to data on one system which are needed on the other system are replicated as they occur allowing the applications and end users on each system access to the local data in a near real-time manner. Many financial institutions perform much of their core transaction processing and all of their settlement activity on legacy mainframe systems. Most of the new applications that these institutions would like to use, however, are written for newer computer platforms and modern SQL databases. By using "Bidirectional Heterogeneous Database Replication," these institutions can utilize both their legacy systems and modern systems, databases, and applications and propagate data changes from either system/database to the other.

While the business applications of "Bidirectional Homogeneous Database Replication" and "Bidirectional Heterogeneous Database Replication" are quite different, the technology that enables each is the same. The technical difference between unidirectional database replication and "Bidirectional Database Replication" is that "Bidirectional Database Replication" can recognize the origin of a given transaction and apply the transaction from one database to the other without then necessarily applying it back to the database from which it originated.

FIG. 1 shows a diagram of a low-latency unidirectional data replication system 10 used in one commercially available product called Shadowbase™, available from ITI, Inc., Paoli, Pa. Shadowbase runs on Tandem's Non-Stop Kernel D20 or higher operating system. Shadowbase captures changes made by applications (application programs 12) to audited database files or tables, known as the source database 14, and applies those changes to another version(s) of that database, known as the target database(s) 16 (hereafter, "target database 16'). The source database(s) 14 can be in Enscribe or SQL or a combination of both formats. The target database 16 can be in the same format as the source database 14 or another format, such as Oracle, Microsoft SQL Server or Sybase, or the system 10 can have multiple target databases 16 in a combination of formats. The target database 16 may be elsewhere on the same system 10, or on another Tandem node, or in a UNIX or NT environment, or a combination of the above. The target database 16 does not have to be an exact replica of the source database 14. Target field/columns can be in a different order within a file/table; fields/columns can appear in the target that don't exist in the source, fields/columns that appear in the source do not have to appear in the target. Source rows can be filtered off and thus may not appear in the target database 16 at all. Also, source rows can be aggregated, meaning multiple source rows are collapsed into one or more target rows. In addition, with the inclusion of specially written custom code (via User Exits), a target database 16 may be created which is very different from the source database 14.

As applications 12 make modifications (e.g., inserts, updates and deletes) to the data in the audited source database 14, TMF (transaction monitoring facility) or TM/MP (transaction monitoring/massively parallel) records the details of the transactions in audit trail files 18. A Shadowbase object or process, known as a "collector" (collector 20) reads the audit trails in the audit trail files 18 and collects changes made to the source database 14. These changes are then sent via interprocess message to another Shadowbase object or process, known as a "consumer" (consumer 22). The consumer 22 applies the changes to the target database 16 on the Tandem NonStop Kernel system or formats messages that are then sent to the Shadowbase open server running in a UNIX or NT environment. Any custom code for User Exits becomes part of the consumer 22. The functioning of the respective collector and consumer objects 20 and 22 are constantly monitored by a third Shadowbase object known as AUDMON 24. All of the Shadowbase objects send informational messages to Tandem's Event Management System (EMS) to facilitate operating the system. To allow users to configure, control and gain additional object status information, Shadowbase comes with a command interface, AUDCOM 26. The audit trail is a log of the changes which have been made to the source database 14. The audit trail contains an Event Sequence list of the changes that have been made to the source database 14. The list of changes may comprise individual operations performed on the source database (e.g., insert a row, update a row) or operations performed on all or a set of records in the source database 14 (e.g., increase the price column by 10%). Any operations logged to the database must be reversible. If the operations are not reversible, the main use of the audit trail, which is to back out aborted operations, would fail. Events in the audit trail are usually tagged with a transaction identifier and multiple transactions may overlap.

The system 10 also includes a restart file 27 connected to the collector 20. The function of the restart file 27 is described below in the "Definitions" section.

Bidirectional replication simplifies the manual procedures necessary to manage outages of a system during planned and unplanned switchovers. These procedures are currently required due to a replication side effect, which is referred to herein as "ping-pong." That is, if you attempted to configure a "bidirectional" and live stand-by environment with two unidirectional schemes, transaction audit events would oscillate indefinitely between the two systems. This is because events applied on one system would be captured and would continually be bounced back and forth, thereby resulting in a "ping-pong" effect. Conventional unidirectional replication requires manual procedures to turn on the flow or start a stand-by copy following a fail-over (once the original primary system has come back on line as the backup system), due to operational complexities in managing this environment. Resolving the bidirectional "ping-pong" issue would then provide the capability for a "Sizzling Hot Stand-By" environment, particularly if the latency time is low. ("Latency" is defined as the time that the commit takes place on one system to be applied on the peer or other system.) Once a solution is provided to remove the "ping-pong," two-way flow is then possible. Note that it is not necessary to provide a means to detect or eliminate collisions, in the event that replication is enabled in both directions simultaneously. Collision avoidance is primarily an application-related issue that requires some method of version identification in the database record and is complimentary to bidirectional replication.

Conventional data replication systems typically consist of two or more computers that use the same program(s) or type(s) of program(s) to communicate and share data. Each computer, or peer, is considered equal in terms of responsibilities and each acts as a server to clients in the network.

Conventional peer-to-peer data replication methodologies are bidirectional and also often have the freedom that the updates to particular data rows can occur on either system and thus involve a conflict resolution mechanism to prevent ping-pong.

Conventional peer-to-peer, bidirectional data replication systems rely on one of the following schemes:

1. Database Partitioning
2. Master copy
3. Row versioning
4. Time resolving updates
5. Oracle Corporation patented schemes
6. Pass the Book A general discussion of these schemes follows below.

1. Database Partitioning—This approach to application systems design is appropriate when the users and their activity can be naturally partitioned and directed to a single server in the network. Examples would be telephone credit card processing, cellular phone processing, etc. The work is usually partitioned by physical geography. Other partitioning schemes are by logon name or ID, client name, client group, etc. Updates for a customer never actually happen on more than one system at a time. Thus, collisions and ping-pong never occur and two unidirectional systems suffice.

Database partitioning is not a very practical solution, unless a user is willing to repartition their database to accommodate this approach. In general, most users are often unable to repartition their database. In fact, in some instances, there might be technical performance reasons for partitioning their database using different keys (e.g., load balancing, throughput, etc.) than the keys useful for bidirectional partitioning.

2. Master copy—If the database of one system is designate as the master copy, then all updates are funneled through this system in this scheme. The updates are then always flowing from the peer system containing the master database copy, whereas reads are often done locally.

The master copy approach can cause LAN utilization delays and has operational issues with designating the master copy, especially when the master has been offline for a period of time and a new master copy needs to be chosen. Also, requiring that the updates flow through one master copy means that some updates may wait on row or table locks and thus updates may have a high latency. One example of a master copy scheme is described in U.S. Pat. No. 5,781,910 (Gostanian et al.) assigned to Stratus Computer, Inc.

3. Row versioning—Some applications need to maintain version numbers in records and carry the version number from machine to machine. When the version number that an application updates is inconsistent with the version number that is stored in the database, corrective action is required. In such cases, a user exit on the target system receives a record from a source system, locks and reads the appropriate record on the target system and compares version numbers. If the version numbers are consistent, then the application updates unlocks the target system record. If the versions are not consistent, one of the following rules is selected:

1. The user exit can take corrective action according to a predefined business rule.
2. The user exit can notify a human for manual intervention.
3. The user exit can reject the change and log the event.
4. The user exit can accept the change and log the appropriate information so that another process or human can ensure that the proper action was taken. A major challenge of this scheme is the creation of efficient collision or conflict resolution stubs according to one or more of the above rules. Conflict resolution is an application-dictated piece of code. In some applications there is no need for conflict resolution because the application only inserts records with unique keys or simply assigns a value to a total without regard to the previous total. When the insert comes over to the target system, a user exit inserts the record and updates a total field as one unit of work. When the update to the total record comes over from the other machine, it is ignored because the transaction has already accounted for the increment or decrement in the total. Ping-pong is avoided when the particular conflict detected is that the row version numbers match and the change is then discarded.

In summary, row versioning requires modifications to the database, and is a fairly challenging operational issue for most users, and thus is difficult to implement and often has a high latency.

4. Time resolving updates—In this scheme, row updates with either the lowest or largest timestamp or sequence number wins, depending upon what is important to the user. This mechanism is useful if the future state of a row does not depend upon the current state of a record. For example, adding the number two to a total column may be a problem if it were rejected over a later update but not setting the total column to an absolute value. This technique is often used with synchronizing e-mail systems. Often, this technique will prompt the user for which row to take (e.g., the update from system A or B). For many reasons, this technique has severe operational issues with database consistency and restartability. In reality, this scheme is a variation on the previous (row version) scheme and has many of the same operational problems.

5. Oracle Corporation patented schemes—The scheme in U.S. Pat. No. 5,737,601 (Jain et al.) places information regarding database modifications in a set of replication tables. Ping-pong of row updates is prevented by the usage of global variables or special log tables in conjunction with database triggers. Oracle's replication scheme has many limitations. Also, various restart problems result from its design. Furthermore, the replication becomes tightly bound to the original application update which results in a higher latency, a slowing down of the application, or an application failure if the communication channel is unavailable.

6. Pass the Book—Simple unidirectional replication can be used in a bidirectional capability if it is only turned on in one direction at a time, e.g., on every odd hour from system A to B, and on every even hour from system B to A. In this scenario, the source system must always be the system on which updates are made. This approach is not low-latency and has numerous operational problems, including the inability to fully utilize both systems at all times.

Conventional peer-to-peer schemes, including those discussed above, have a high latency, are limited to the row update level, and/or have significant operational restrictions. Critical to all peer-to-peer, bidirectional data replication methodologies is the requirement to control updates on one system which are replicated to the other system from replicating back to the original system. This problem, presently called "ping-pong," results in an oscillation which would waste considerable computer resources and communication bandwidth and may result in data loss or corruption (a "dirty" database). Likewise, a useful replication scheme must not impact the primary system and must be restartable without data loss or corruption in the event that one or more of the replication peers are not available for a period of time. Accordingly, there is still an unmet need for a data replication scheme which avoids ping-pong, has a low latency, is restartable, and provides operational ease of use. In addition, in some instances, a limited amount of ping-pong may be useful. For example, one may need to see the "pong" reply to verify that all important transactions get applied. Accordingly, there is a need for a bidirectional data replication scheme which allows for selective ping-pong of transactions. The present invention fulfills all of the needs discussed above.

BRIEF SUMMARY OF THE PRESENT INVENTION

The present invention provides various schemes for selectively preventing transaction ping-pong in a bidirectional database replication system. The system includes a first database, a second database, a first transaction transmitter which sends transactions posted to the first database to the second database for replication in the second database, and a second transaction transmitter which sends transactions posted to the second database to the first database for replication in the first database. In each of the schemes, all transactions to be posted to the second database that were sent by the first transaction transmitter are detected, and the first database is inhibited from posting selective transactions which were detected as being originally sent by the first transaction transmitter.

The present invention also provides various schemes for selectively preventing transaction ping-pong in a bidirectional database replication system. The system includes a plurality of nodes connected via communication media in a topology. Each node includes a database and a transaction transmitter which sends transactions posted to the database to a database at one or more other nodes for replication in the databases of the one or more other nodes. In each of the schemes, all transactions to be posted to databases in remote nodes that were sent by a local node are detected, and the database at the local node is inhibited from posting selective transactions which were detected as being originally sent by the local node.

The present invention also provides a scheme for restarting transaction posting to a database in a database replication system. The system includes a database, a transaction receiver which receives transactions sent from a remote source for posting to the database, and a transaction log. The transactions include a remote source transaction identifier. The transaction log includes a local transaction identifier assigned to every transaction received by the transaction receiver and the respective remote source transaction identifier associated therewith. In the scheme, verification occurs as to whether the remote source transaction identifier of a newly received transaction exists in the transaction log, and the posting of the newly received transaction to the database is inhibited if the remote source transaction identifier exists in the transaction log.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings:

FIG. 8A is an audit trail for use with the third scheme of FIG. 7;

FIG. 8B is an audit trail for use with the fourth scheme of FIG. 7;

FIGS. 10A and 10B are audit trails for use with the scheme of FIG. 9;

FIG. 17 is a transaction log for use with a restart scheme in accordance with the present invention.

DETAILED DESCRIPTION OF THE INVENTION

Figure 1:
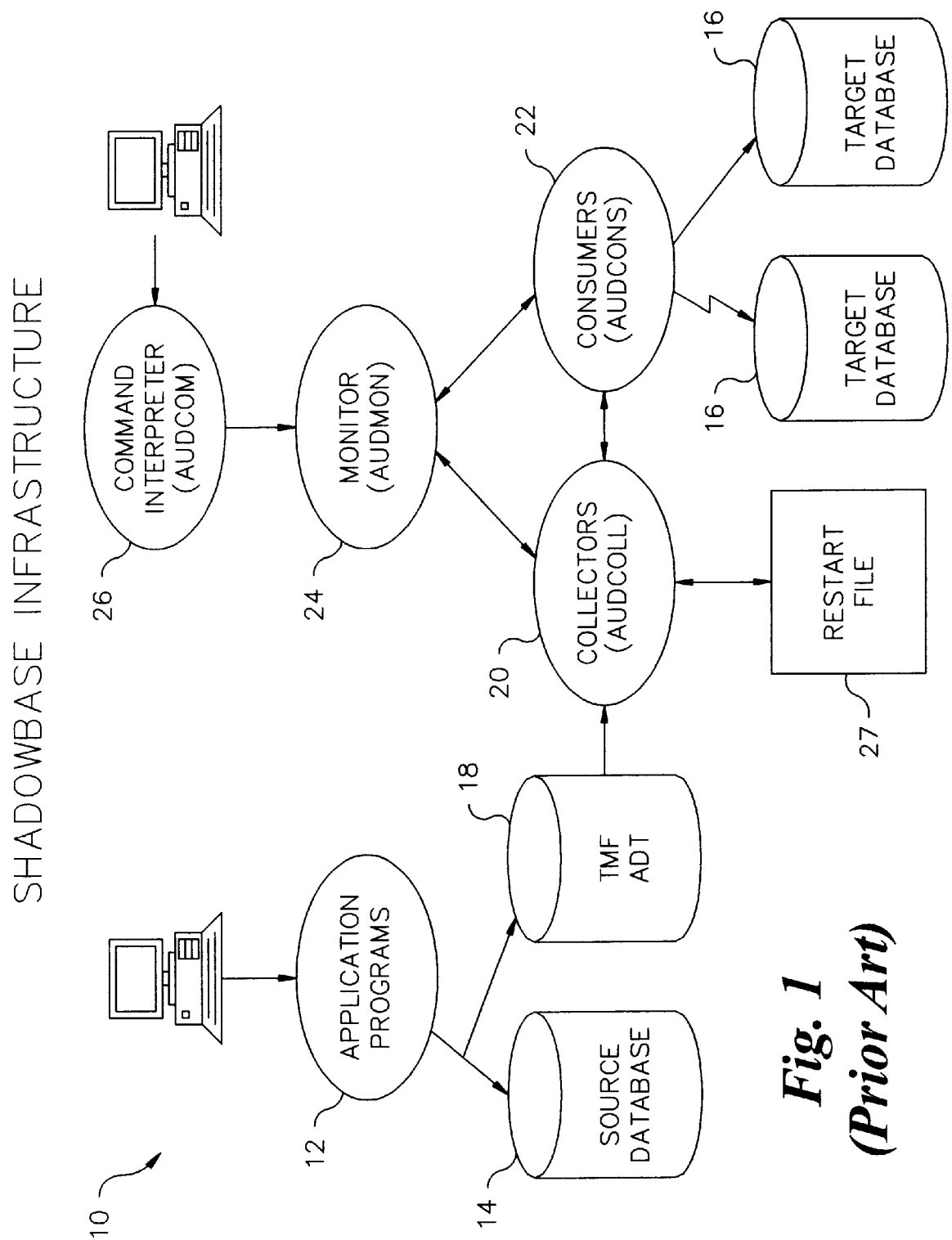
FIG. 1 is a diagram of a prior art low-latency unidirectional data replication system.

Certain terminology is used herein for convenience only and is not to be taken as a limitation on the present invention. In the drawings, the same reference letters are employed for designating the same elements throughout the several figures.

DEFINITIONS

The following definitions are provided to promote understanding of the invention. For clarity, the definitions are phrased with respect to a scheme that replicates only two databases. However, the scope of the invention includes schemes where replication occurs between more than two databases.

Replication—duplicating the contents of at least a portion of data records held in a source database to a target database. In the narrowest sense, replication involves duplicating the entire contents and format of the data records so that the two databases are totally identical, and thus interchangeable with each other. In the broadest sense, replication as defined herein involves duplicating at least the contents of a portion of the data records, and not necessarily duplicating the format of the data records. Replication thus may involve data transformation wherein the source data is altered in some manner before being applied to the target database. The concept of replication vs. transformation of data is discussed in more detail below.

Collector—an object or process that reads an audit trail or other transaction log file of a first database, extracts information about specified changes to the first database (e.g., insertions, updates, deletions), and passes that information to the consumer object or process defined below. In Shadowbase on a Tandem source, the collector reads TMF or TM/MP audit trails. In a bidirectional database replication scheme, each of the two databases has an associated collector. The extractor process shown in FIG. 1 of U.S. Pat. No. 5,745,753 (Mosher, Jr.) assigned to Tandem Computers, Inc is similar in operation to the collector.

Transaction transmitter—device or object which sends transactions posted to one database to the other database for replication in the other database. In one embodiment of the present invention, the transaction transmitter is identical to the collector. In other embodiments, the transaction transmitter performs some, but not all, of the functions of the collector. In a bidirectional database replication scheme, each of the two databases has an associated transaction transmitter.

Consumer—an object or process that takes messages about database changes that are passed by the collector object or process and applies those changes to the second database. In a bidirectional database replication scheme, each of the two databases has an associated consumer. The receiver process shown in FIG. 1 of Tandem's U.S. Pat. No. 5,745,753 is similar in concept to the consumer, except that the consumer described herein can process multi-threaded (i.e., overlapping) transactions, whereas the receiver process in the Tandem patent cannot process multi-threaded transactions.

Transaction receiver—device or object which receives transactions sent by a transaction transmitter for posting to a database. In one embodiment of the present invention, the transaction receiver is identical to the consumer. In other embodiments, the transaction receiver performs some, but not all, of the functions of the consumer. In a bidirectional database replication scheme, each of the two databases has an associated transaction receiver.

Database—in the broadest sense, a database as defined herein comprises at least one table or file of data, or a portion of a table or file of data wherein the data is typically arranged in records called rows. In a narrower sense, a database is also a collection of tables or files, that is, multiple tables or files make up a database. Replication among databases thus has different meanings depending upon how the database is defined. Consider the following examples:

1. A system includes a single database which has two tables or files (i.e., two sub-databases) and the database replicates to itself. Replication thus maintains the two tables or files in the same state. The tables or files are in the same physical location, and each has a respective audit trail, collector and consumer.

2. A system includes a single database which has one table or file partitioned into two parts and the database replicates to itself. The first part has a plurality of records, and the second part has a plurality of records which must be kept in the same state as the first plurality of records. Replication thus maintains the two parts of the table or file in the same state. The two parts of the table or file are in the same physical location, and each has a respective audit trail, collector and consumer.

3. A system includes two databases, each located remotely from the other. Each database may have one or more tables or files, and the two remotely located databases replicate themselves. Replication thus maintains the two databases (including all of their respective tables or files) in the same state. The two databases are in different physical locations, and each has a respective audit trail, collector and consumer. In a typical scenario, each database resides at a different node within a network.

Table—alternative name for a database. In the preferred embodiment of the present invention, replication and copying of data is performed at the file level. However, other levels of replication/copying are within the scope of the invention, such as diskcopy-type operations which are used to create the databases 126 in FIG. 1 of Tandem's U.S. Pat. No. 5,745,753.

Primary replication—effectively, unidirectional replication from a first database to a second database.

Row—effectively, a single record out of a database. A row update is an individual step defined to mean a modification (e.g., insert, update, delete) to the database.

Standby/Reverse replication—effectively, unidirectional replication from the second database to the first database.

Transaction—A transaction is a unit of work consisting of one or more individual steps and/or operations to be applied to one or more local and/or remote databases as a single atomic unit of work. A characteristic of transactions is the requirement that either all steps and/or operations are applied or all are rolled back in the case of a problem so that the database(s) is always left in a consistent state. Transactions are often identified by a number or name called the transaction identifier. The transaction identifier is often, though not necessarily, unique. An example of an "individual step" would be to insert a record (row) into the database. An example of an "operation" would be the procedure which increases the price column of all rows in the database by 10%.

Filtering—The operation of selectively choosing rows or transactions to replicate. Filtering based upon the transaction identifier is important because it allows a great degree of selectivity in comparison to the all or nothing row-based filtering schemes of prior art. Also, filtering in the present invention does not require modifications to the database or transaction log files as does the scheme used in Sybase's Replication Server Product. The net result is significantly less database space usage and an ability to have bidirectional replication to heterogeneous database types.

User Exit—customer application code that is bound in a collector or consumer to "customize" data before it is applied to the target database. One example of a user exit described in the sixth embodiment of the present invention analyzes the contents of records of transaction data and uses the results of the analysis to decide whether or not to forward the record to the next step in the process. Thus, data customization in its broadest sense includes not only schemes for modifying a collection of data records, but also schemes for eliminating or filtering one or more of the data records based upon data record attribute and/or content analysis.

Restart—the steps that need to be taken in the event that one or more of the primary or secondary replication component is unavailable and a restoration of the failed replication component is needed. For example, if a communication channel fails, then any messages that were lost in transit need to be resent during the restart. The restart might be partial, (i.e., just certain or failed components get restarted), or total (i.e., all replication components are stopped and restarted). In either case, a non-transient source of information is needed to effectuate the restart, for instance, to tell the collectors where in the audit trail to start reading for transaction data. A restart file is often used for this purpose. In normal operation, the replication components periodically, or at certain events, log their current position to the restart file so that it can be used when a restart is needed. Some desirable aspects of effective restarts include: (1) few and non-complex system operator steps needed to effectuate the restart, (2) prevention of duplicate database updates from being applied to the target database, (3) restoration or elimination of missing database updates, and (4) minimal restart time.

In the examples of the present invention described below, the first and second transaction transmitters are first and second collectors, the first and second transaction receivers are first and second consumers, and the first and second databases are first and second target tables. Also, the examples below presume that strict database replication occurs without any transformation of the contents of the data or its format. However, the scope of the invention include bidirectional replication schemes wherein at least the contents of a portion of the data or its format are transformed.

Figure 2:
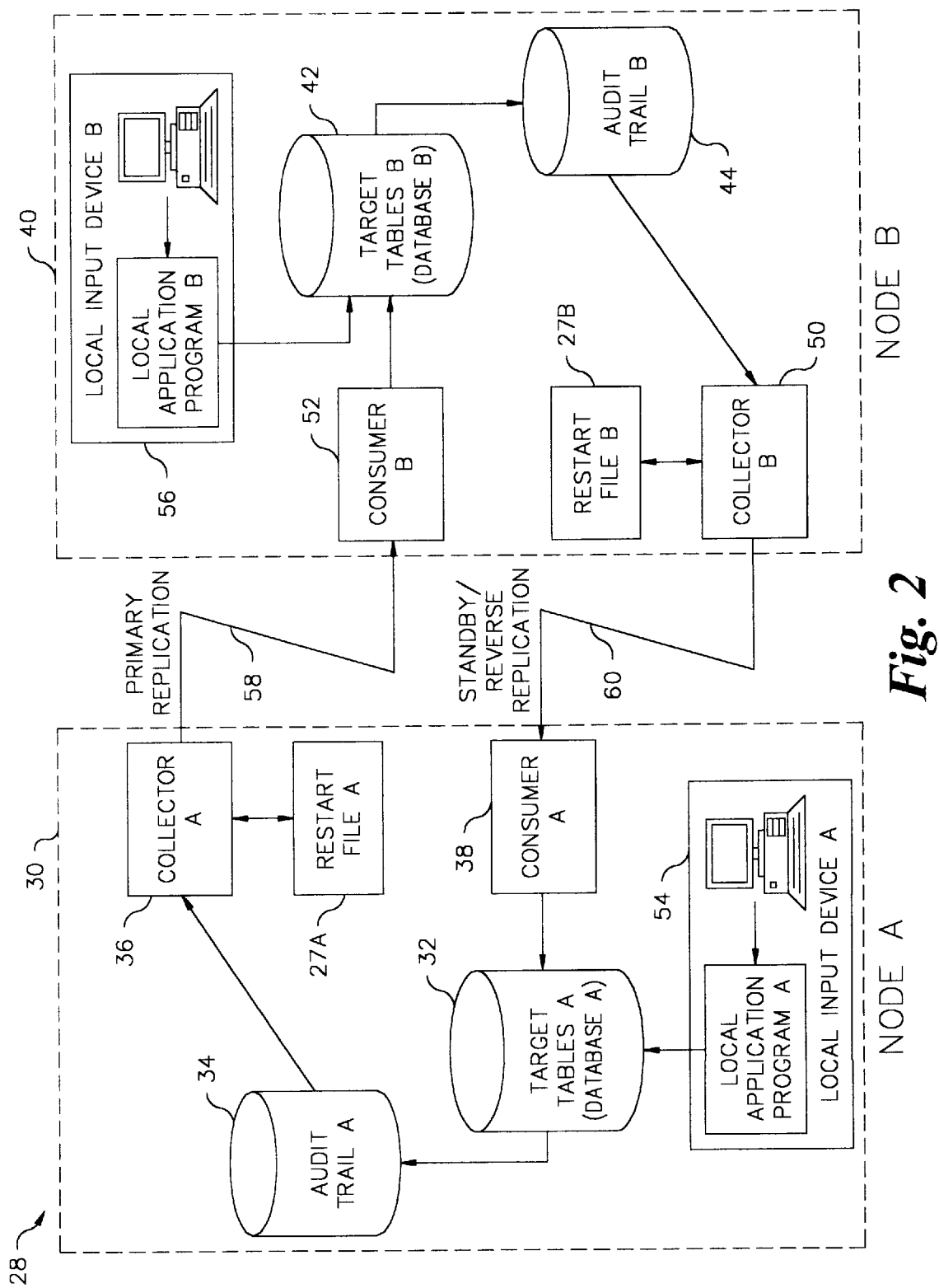
FIG. 2 is a schematic block diagram of a bidirectional data replication system for use with the present invention.

FIG. 2 is a diagram of the infrastructure for a bidirectional replication system 28 in accordance with the present invention. In this diagram, the two databases or target tables which must be kept in the same state are located remotely from each other at different nodes in a network. However, as discussed above, the two databases may be in the same physical state and may even represent the same database replicating to itself. Thus, the communication lines shown in FIG. 2 may be merely internal data flow paths within a single computer memory, such as a bus line.

Referring to FIG. 2, the system 28 has a first node 30 comprising a first target table 32, a first audit trail 34, a first collector 36 and a first consumer 38. The system 28 also has a second node 40 comprising a second target table 42, a second audit trail 44, a second collector 50 and a second consumer 52. To simplify the explanation of the invention, the following terminology is used interchangeably:

restart file 27A—restart file A
restart file 27B—restart file B
first node 30—node A
first target table 32—target table A or database A
first audit trail 34—audit trail A
first collector 36—collector A
first consumer 38—consumer A
second node 40—node B
second target table 42—target table B or database B
second audit trail 44—audit trail B
second collector 50—collector B
second consumer 52—consumer B
combination of collector A and consumer B—primary replication subsystem
combination of collector B and consumer A—stand-by/reverse replication subsystem In addition to the elements above, one or both of the nodes A and B include one or more local input devices 54 and 56, referred to interchangeably as "local input device A" and "local input device B." The local input devices A and B make local modifications (e.g., inserts, updates and deletes) to the data in the respective databases A and B as part of a complete transaction in a similar manner as application programs 12 described in FIG. 1. Alternatively, the local input devices A and B may be located outside of the nodes A and B, and may be connected via a communication medium to one of the nodes. The local input devices A and B may be batch programs having no user or terminal i/o.

The databases A and B, audit trails A and B, collectors A and B and consumers A and B are connected together as discussed above in the definitions section. More particularly, the collector A is connected to the consumer B via communication medium 58 to provide primary replication, and the collector B is connected to the consumer A via communication medium 60 to provide standby/reverse replication.

In operation, any modifications made by the local input device A to the database A must be replicated in the database B. Likewise, any modifications made by the local input device B must be replicated to the database A.

The restart files A and B are similar in function to the conventional restart file 27 shown in FIG. 1.

The potential ping-pong problem may be clearly illustrated by FIG. 2. Unless some scheme is used to prevent the problem, the following steps would occur:

1. Audit trail A would build a list of all transactions posted to the database A, whether the transactions originated from the consumer A or from the local input device A.

2. All of the transactions in the audit trail A would be collected by the collector A and transmitted to the consumer B which would post them in the database B.

3. Audit trail B would build a list of all transactions posted to the database B, whether the transactions originated from the consumer A or from the local input device 56.

4. All of the transactions in the audit trail B would be collected by the collector B and transmitted to the consumer A which would post them in the database A.

5. Steps 1–4 would be continuously repeated, thereby causing the same transactions to circulate indefinitely throughout the system 28 (i.e., to ping-pong between node A and B). Even more disruptive is that the databases A and B could have correct data overwritten by previously posted data, thereby destroying the integrity of both databases.

To prevent such ping-ponging, the present invention provides different schemes for inhibiting or controlling the database A from posting any transactions which were detected as being originally sent by the collector A and for inhibiting or controlling the database B from posting any transactions which were detected as being originally sent by the collector B. In operation, the collector A reads out the contents of the audit trail A which represents the postings to the database A. Thus, by inhibiting or controlling the database A from posting any transactions which were detected as being originally sent by the collector A, the scheme inherently prevents the database A from posting any transactions which were previously posted to the database A, such as any transactions previously received at the consumer A and any transactions previously entered by the local input device A. Likewise, the collector B reads out the contents of the audit trail B which represents the postings to the database B. Thus, by inhibiting or controlling the database B from posting any transactions which were detected as being originally sent by the collector B, the scheme inherently prevents the database B from posting any transactions which were previously posted to the database B, such as any transactions previously received at the consumer B and any transactions previously entered by the local input device 56.

Figure 3:
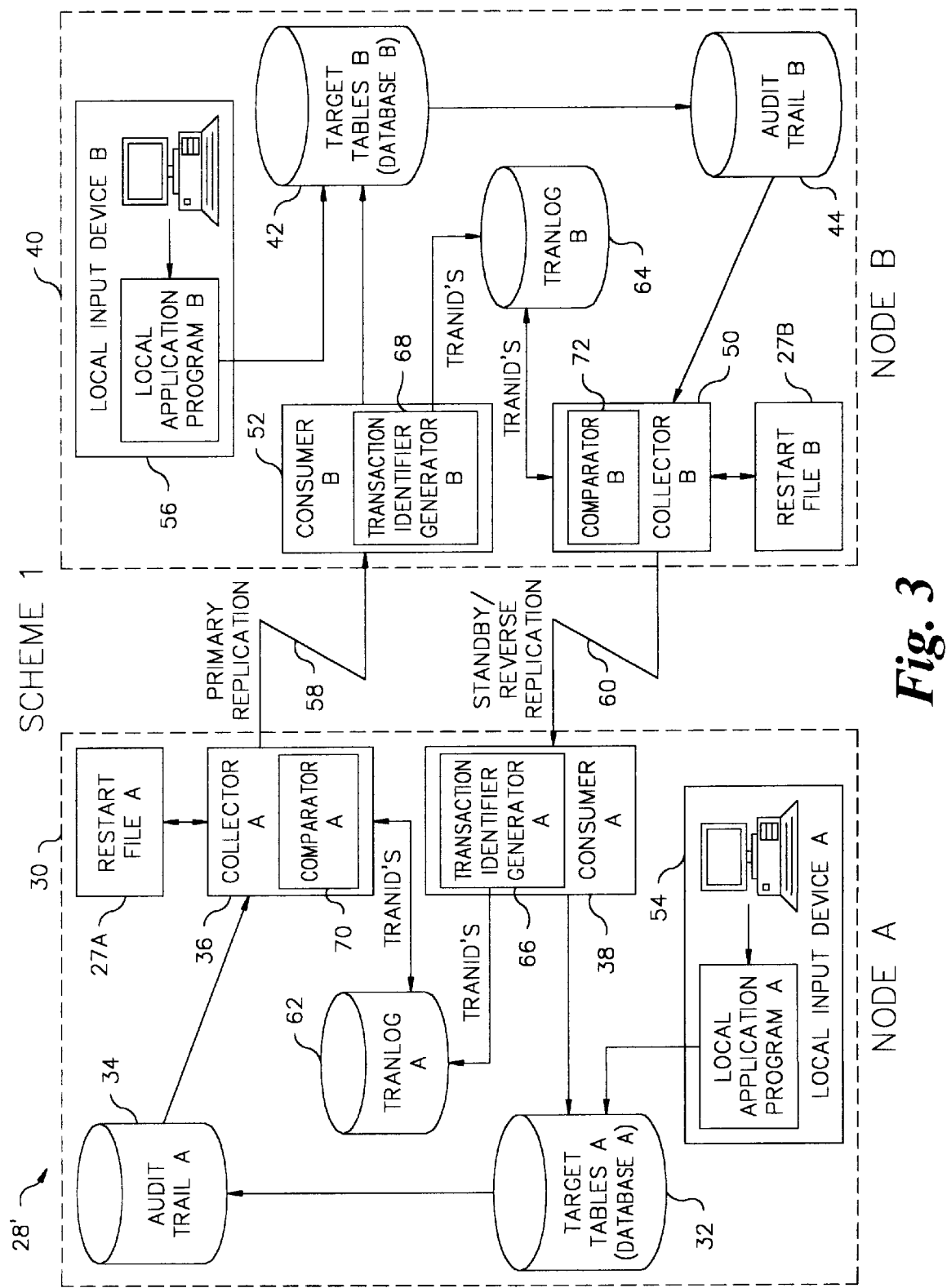
FIG. 3 is a schematic block diagram of a bidirectional data replication system in accordance with a first scheme of the present invention.

FIGS. 3–12 illustrate a plurality of different schemes for preventing ping-ponging of transactions. FIGS. 3–12 each build upon the basic system configuration shown in FIG. 2. The schemes may be described generally as follows:

Scheme 1. Use of collector transaction identifiers (FIG. 3)

Figure 5:
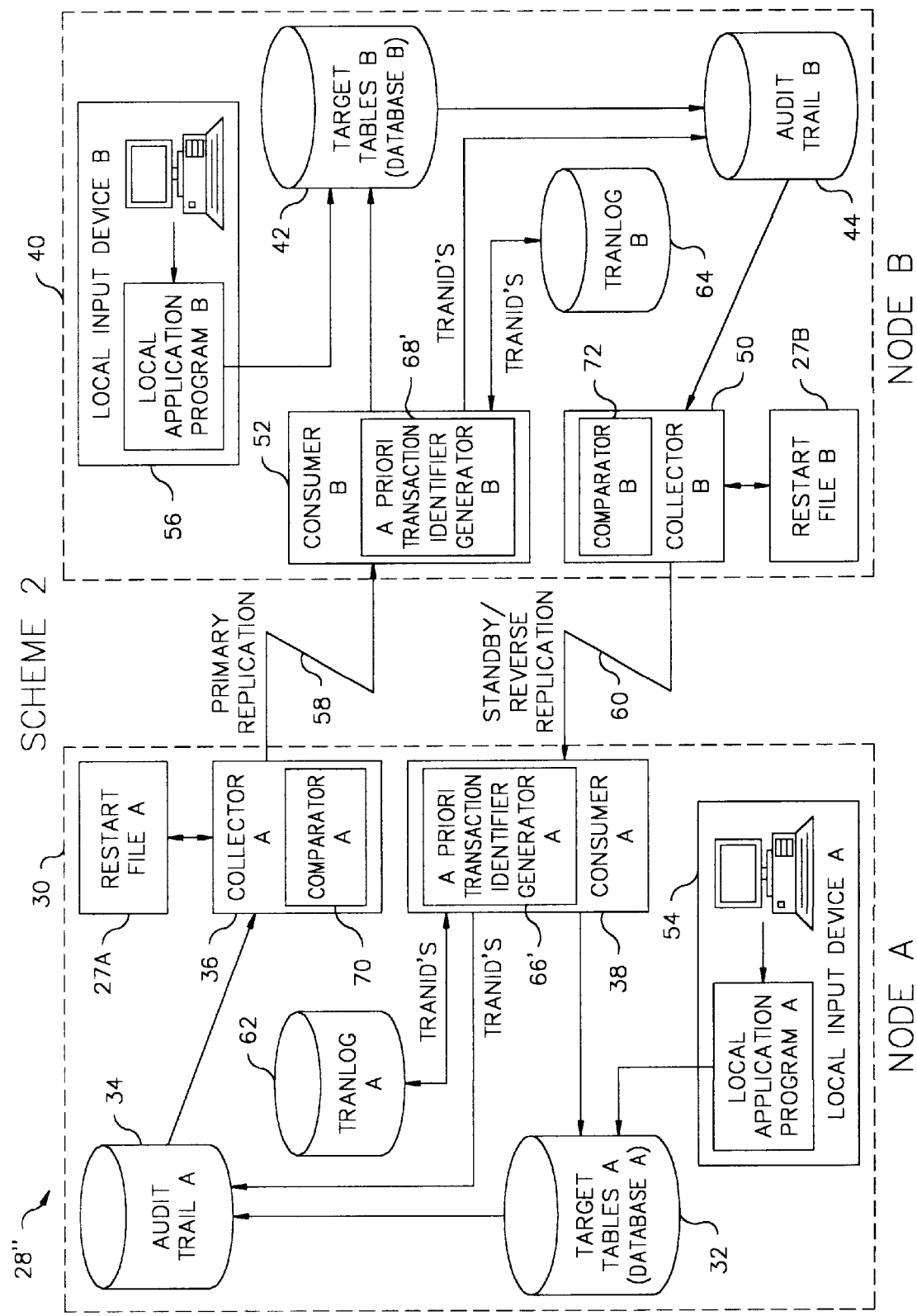
FIG. 5 is schematic block diagram of a bidirectional data replication system in accordance with a second scheme of the present invention.

Scheme 2. Use of a priori audit transaction tokens (FIG. 5)

Figure 7:
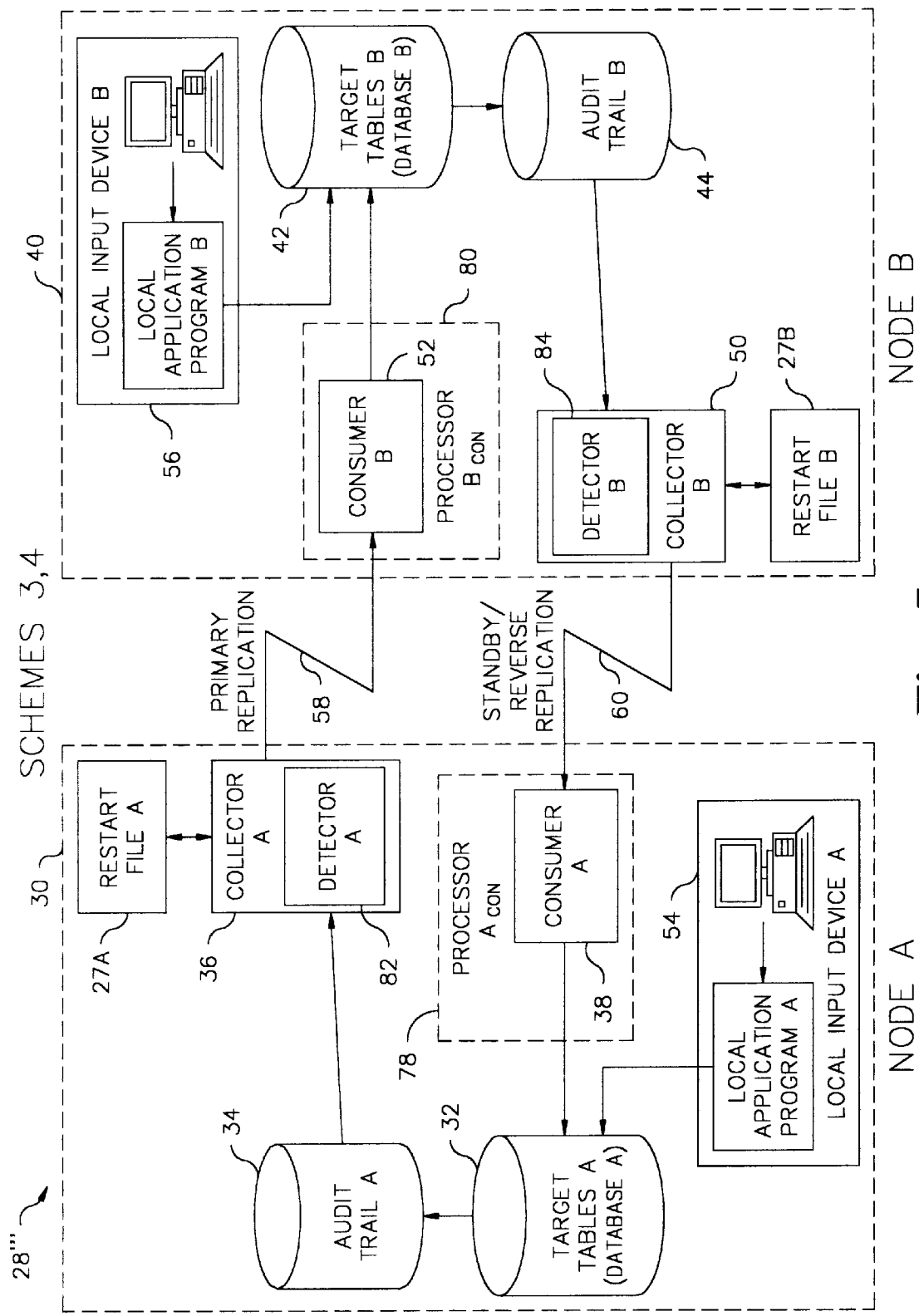
FIG. 7 is schematic block diagram of a bidirectional data replication system in accordance with a third and a fourth scheme of the present invention.

Scheme 3. Partitioning based upon operating system resources, e.g., CPUs (FIG. 7)

Scheme 4. Use of natural audit trail identifiers (FIG. 7)

Figure 9:
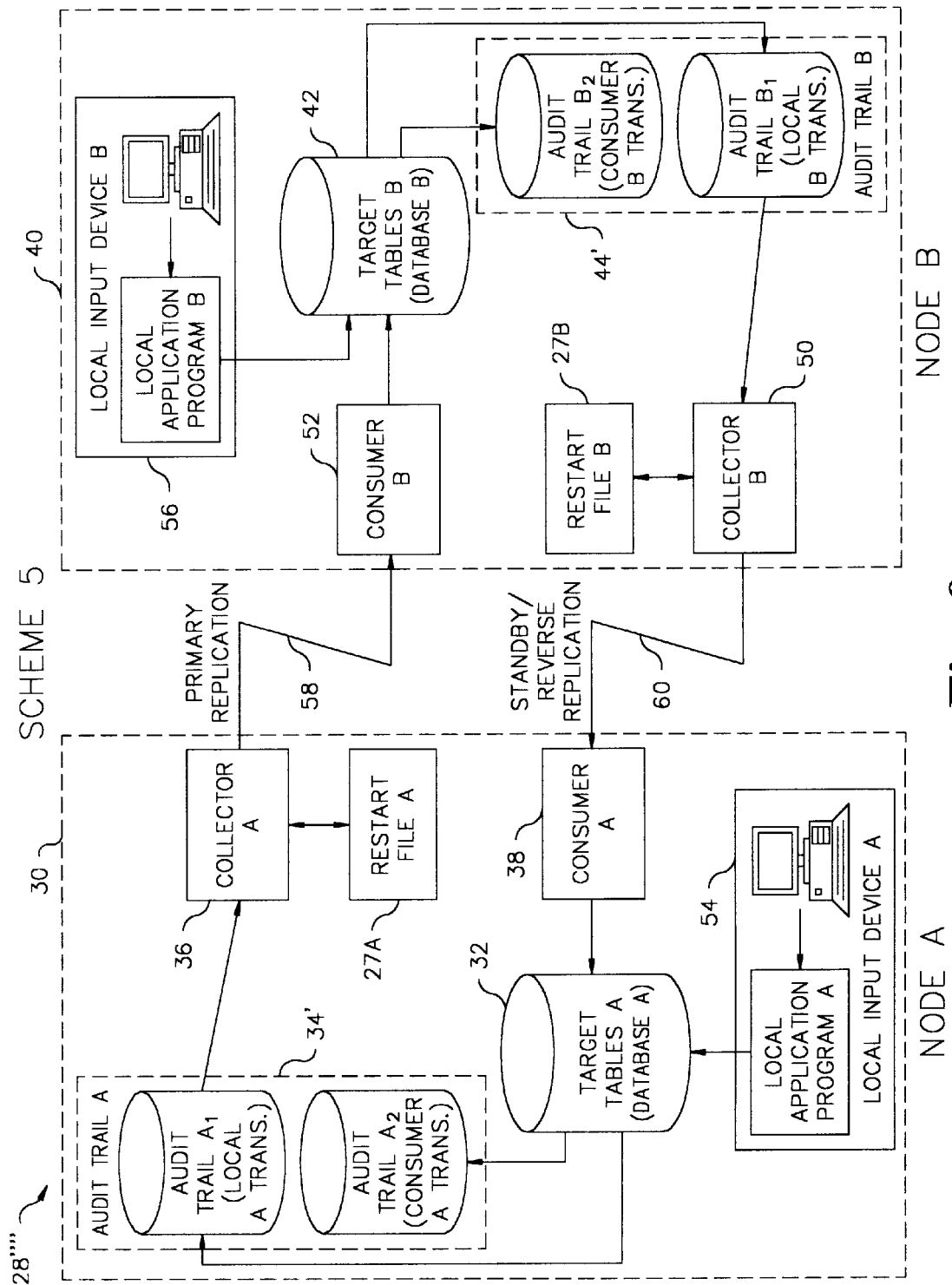
FIG. 9 is schematic block diagram of a bidirectional data replication system in accordance with a fifth scheme of the present invention.

Scheme 5. Partitioning based upon audit trail resources (FIG. 9)

Figure 11:
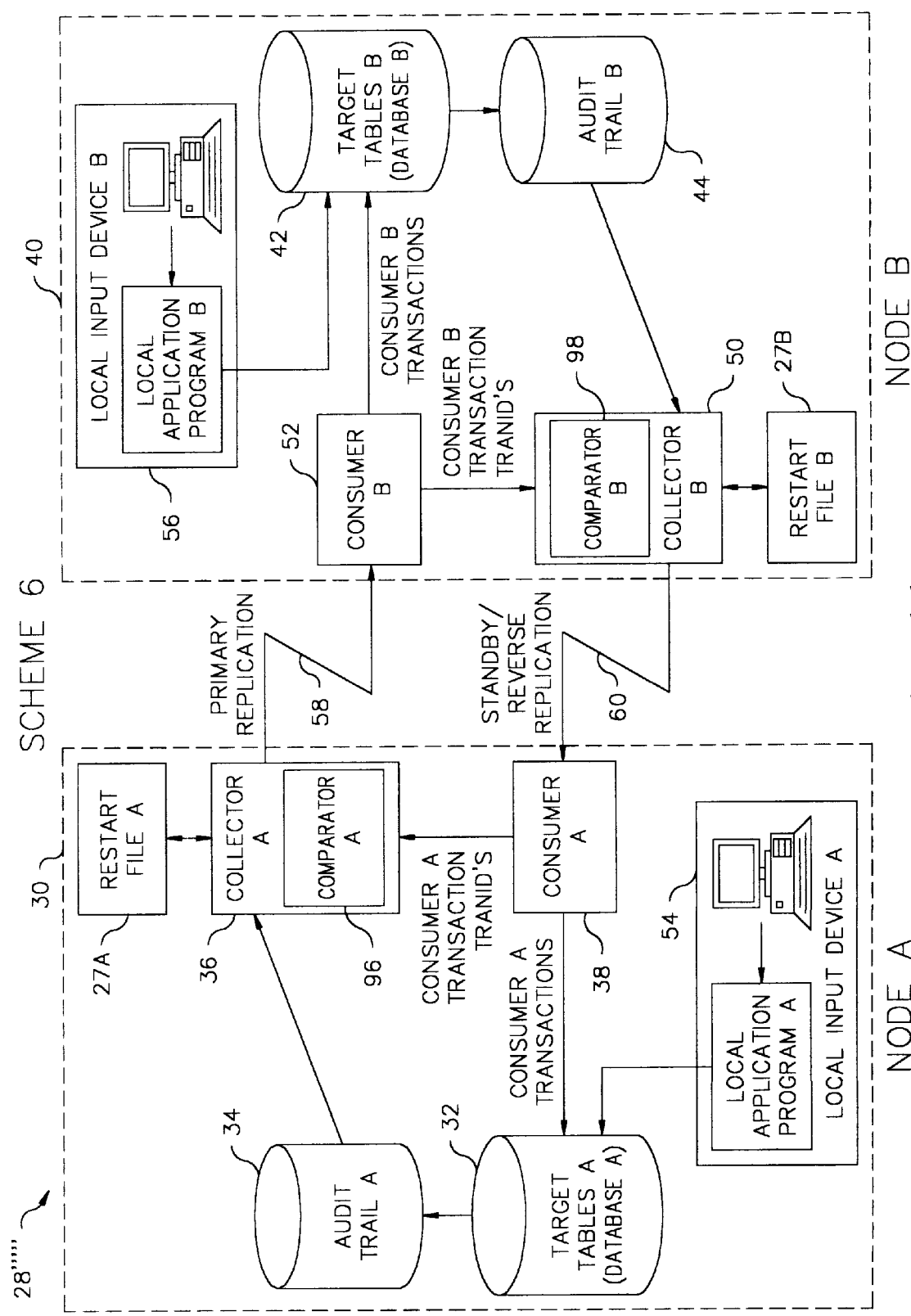
FIG. 11 is schematic block diagram of a bidirectional data replication system in accordance with a sixth scheme of the present invention.

Scheme 6. Use of interprocess messaging (FIG. 11)

Figure 12:
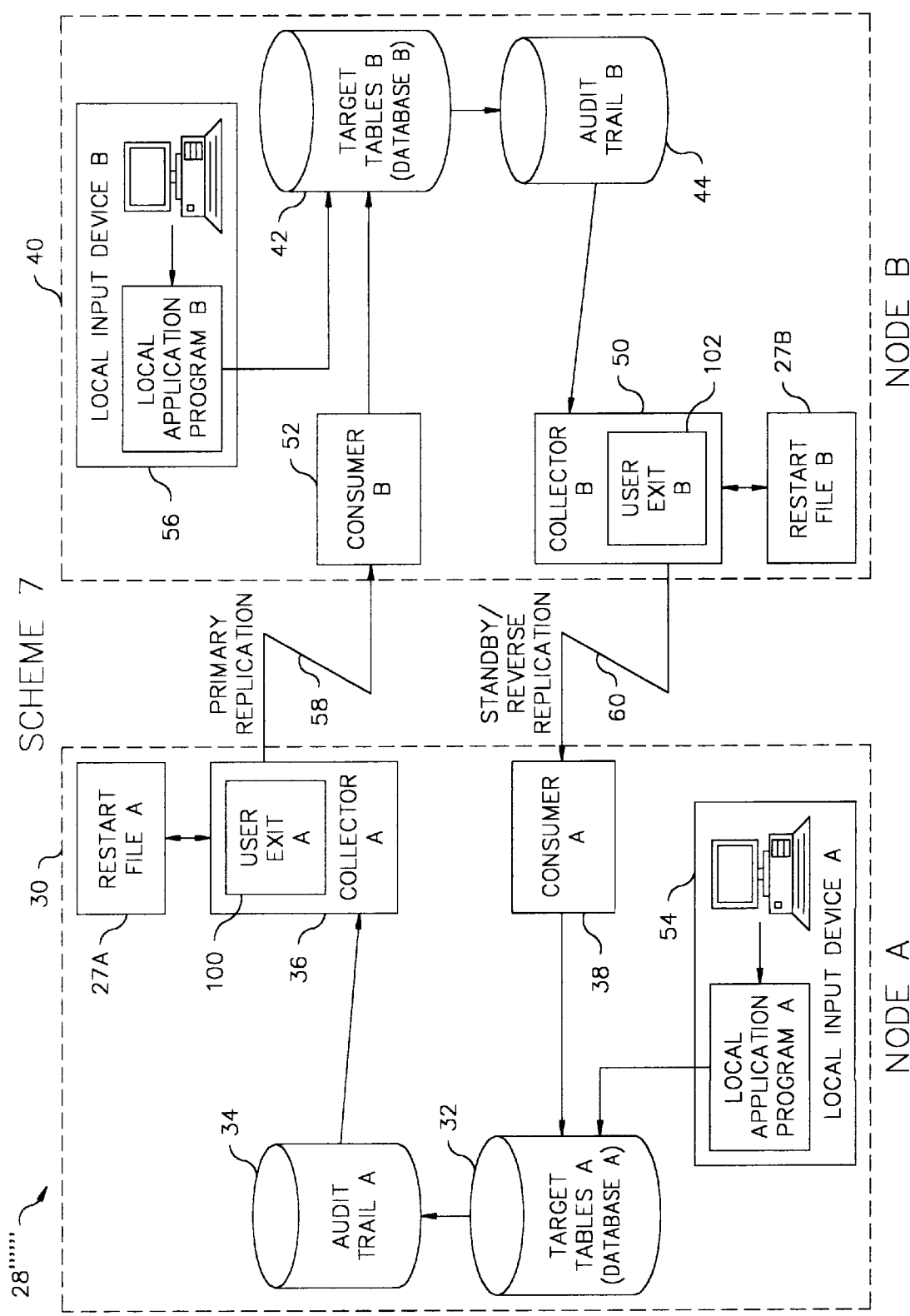
FIG. 12 is schematic block diagram of a bidirectional data replication system in accordance with a seventh scheme of the present invention.

Scheme 7. Use of application knowledge (FIG. 12)

SCHEME 1

COLLECTOR TRANSACTION IDENTIFIERS

FIG. 3 is a diagram of a bidirectional replication system 28' in accordance with a first embodiment of the present invention. FIG. 3 is similar to FIG. 2, except for the following differences:

1. A transaction-tracking file or transaction log 62 is provided at node A (identified as TRANLOG A), and a transaction log 64 is provided at node B (identified as TRANLOG B). TRANLOG A is connected at its input to the output of consumer A and is connected at its output to the input of the collector A. Likewise, TRANLOG B is connected at its input to the output of consumer B and is connected at its output to the input of the collector B.

2. Consumer A includes a transaction identifier generator 66, consumer B includes a transaction identifier generator 68.

3. The collector A includes a comparator 70 and the collector B includes a comparator 72. Comparators 70 and 72 are referred to interchangeably as "comparator A" and "comparator B," respectively. The outputs of the TRANLOG A and B are connected to the inputs of the comparators A and B, respectively.

In operation, the transaction identifier generator 66 assigns a transaction identifier (TRANID) to every transaction received by the consumer A which is posted to the database A. Likewise, the transaction identifier generator 68 assigns a TRANID to every transaction received by the consumer B which is posted to the database B. (Typically, all transactions received by a consumer will be posted to its database.) The transaction identifier generators 66 and 68 are programmed so that all TRANIDs are unique.

Two actions are taken after a TRANID is generated and assigned. First, the TRANID is stored in a TRANLOG. TRANIDs generated and assigned by the transaction identifier generator A are stored in TRANLOG A and TRANIDs generated and assigned by the transaction identifier generator B are stored in TRANLOG B. Second, the TRANIDs are associated with the respective transaction and thus become logged in the audit trail along with the transaction data. Thus, the audit trail A includes the TRANID for each transaction posted to the database A by the consumer A and the audit trail B includes the TRANID for each transaction posted to the database B by the consumer B.

Figure 4:
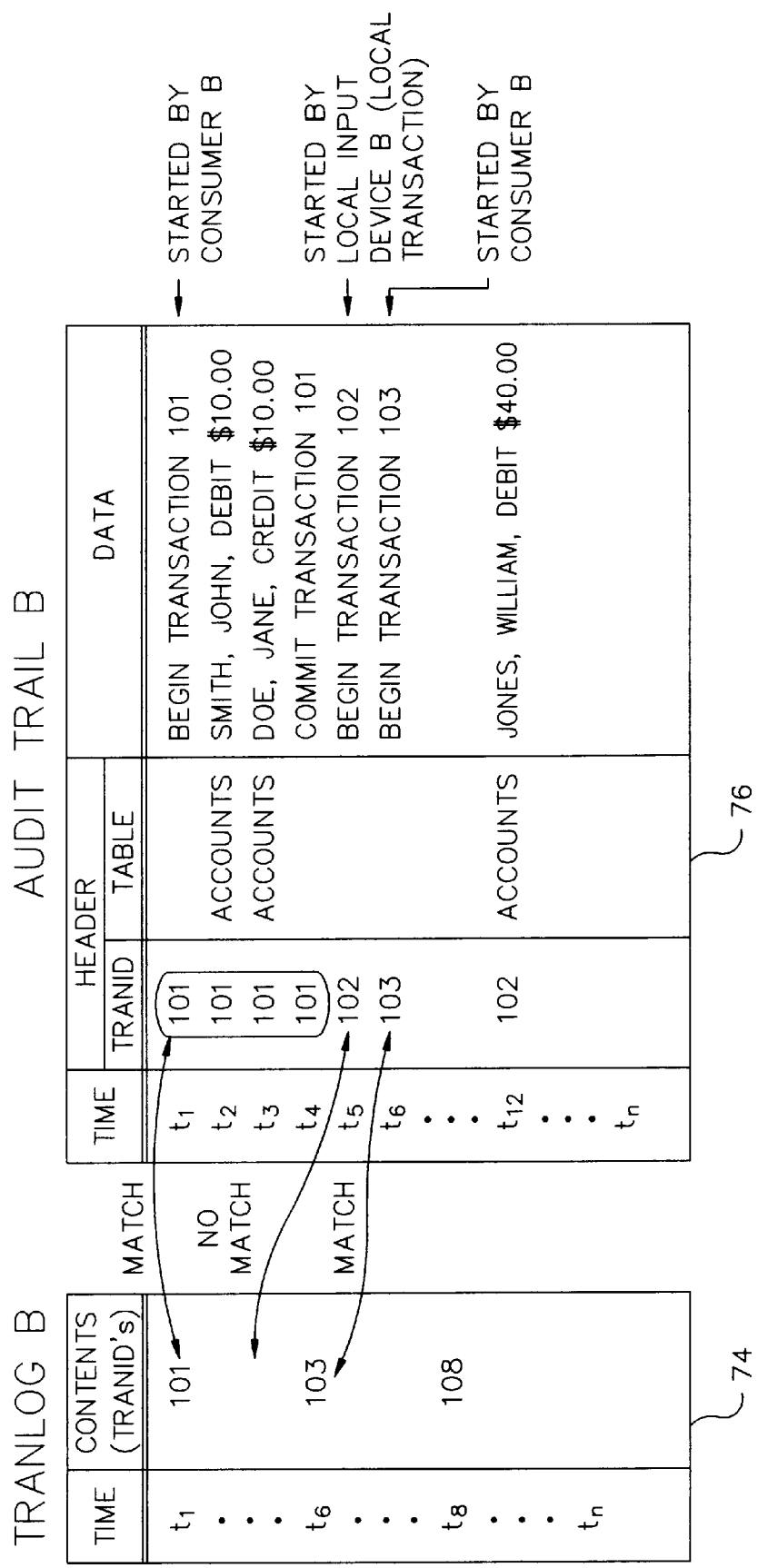
FIG. 4 is a transaction log and an audit trail for use with the scheme of FIG. 3.

FIG. 4 shows an example of a portion of a transaction log 74 stored in TRANLOG B, and a portion of the audit trail 76 stored in audit trail B which coincides in time with the portion of the transaction log 74. In the example shown in FIG. 4, the database B receives a continuous stream of transaction activity from both the consumer B and the local input device B. Thus, the audit trail B includes an intermixture of transactions having TRANIDs assigned by the transaction identifier generator B (as a result of being posted to the database B by the consumer B) and transactions having TRANIDs not assigned by the transaction identifier generator B because they were locally posted directly to the database B. The elements for assigning TRANIDs to the local transactions are not shown in FIG. 3 but are well-understood by an artisan. In an alternative scheme, the transactions posted from the local input device B have no TRANIDs.

In operation, the collector B continuously reads audit trail B, collects changes made to the database B, and sends these changes to consumer A. In addition, the comparator B detects any transactions in the audit trail B which has a TRANID similar to a TRANID in the transaction log and inhibits the collector B from sending such transactions to the consumer A. In this manner, the database A never receives any transactions that originated within it, since any transactions sent by collector A and received by consumer B is assigned a TRANID and is stopped by the comparator B from being sent back to the consumer A. Any transactions posted to the database B directly by the local input device B are not blocked by the comparator B and thus are sent by the collector B to the consumer A because such transactions either have TRANIDs which do not match any TRANIDs stored in the TRANLOG B or have no TRANID. A similar series of steps is performed in the collector A at node A, thereby preventing transactions which originated in database B from being returned back to node B.

Referring to FIG. 4, the TRANIDs associated with the transaction data stored at $t_1$–$t_4$ in the audit trail B (TRANID 101 in this example) match a TRANID stored in the TRANLOG B. Thus, the comparator B blocks or filters out all of the transaction data stored at $t_1$–$t_4$, thereby preventing collector B from sending this data to node A. However, the TRANID associated with the transaction data stored at $t_5$ in the audit trail B (TRANID 102 in this example) does not match a TRANID stored in the TRANLOG B. Thus, the comparator B allows the transaction data stored at $t_5$ (as well as the transaction data stored at $t_{12}$, and any subsequent transaction data tagged with TRANID 102) to be sent to node A.

In the illustrated embodiment, no transaction data is stored in the TRANLOGs. That is, only the TRANID is stored therein. However, transaction data may be stored in the TRANLOGs to provide additional fields for redundancy checking against the audit trail data.

One disadvantage of scheme 1 is that the TRANLOGs become larger and larger as more TRANIDs are generated. Periodic purging of the TRANLOG is risky since some transactions may take a long time to become posted. If a TRANID is purged from the TRANLOG and later appears in the audit trail, the transaction would not be blocked by the collector.

In scheme 1, the time lag between initiation of a transaction by collector B on behalf of transactions sent from node A and seeing the transaction at the consumer B depends on how far system B is behind in replication. If replication from node B back to node A was far behind or stopped, TRANIDs would have to be stored in a file. Since the collector B only receives TRANIDs whose data must be eliminated, the collector B can remove the transaction from the list when it has applied all work associated with the transaction and received the commit, and when the possibility of a restart operation has passed. This becomes somewhat more complicated if there are multiple collectors. It is believed that the correct answer for multiple collectors is to have each collector maintain its own list.

In certain schemes, the TRANLOG table may also be used when performing a restart. If the TRANLOG is used for restarts, updates to the TRANLOG may be done as part of the transactions against the target database. For example, if consumer B starts a transaction with TRANID 101, then consumer B inserts TRANID 101 into the TRANLOG as part of that very transaction, thus ensuring that if the transaction is aborted, the TRANLOG will not show that TRANID 101 has been processed. Note, however that to be useful, the TRANLOG would also need another column, to which is assigned a unique index, which contains the source transaction TRANID read out of the audit trail by the collector. In this manner, duplicate transaction processing would be verified and avoided by seeing that the insert to the TRANLOG file failed on the unique index for the source transaction TRANID. The entire source transaction would be marked to be filtered or skipped in this case. An alternate verification method to the unique index would be to have the consumer read the TRANLOG.

FIG. 17 shows a portion of a TRANLOG table 75 which may be used when performing a restart. The TRANLOG table 75 logs locally generated TRANIDs and their associated remote source TRANIDs. In the example shown in FIG. 17, a restart occurs at time $t_3$. At time $t_4$, a transaction is received which has a remote source TRANID that matches a previously logged TRANID. This transaction is not posted since it is presumed to have already been posted.

SCHEME 2

A PRIORI AUDIT TRANSACTION TOKENS

FIG. 5 is a diagram of a bidirectional replication system 28" in accordance with a second, and preferred embodiment of the present invention. FIG. 5 is similar to FIG. 3, except for the following differences:

1. The node A transaction identifier generator 66 is an "a priori" transaction identifier generator 66' and the node B transaction identifier generator 68 is an "a priori" transaction identifier generator 68'. The transaction identifiers or TRANIDs discussed in scheme 1 may also be referred to as "transaction tokens" when seen in the audit trail in scheme 2 because a token is a piece of information, a symbol or a distinguishing mark passed from one entity to another. In the present invention, the token is the audit trail record produced by the mere act of updating the TRANLOG file with new TRANIDs.

2. The outputs of the a priori transaction identifier generators A and B are also connected to the inputs of the respective audit trails A and B.

3. The outputs of the TRANLOGs are not connected to the inputs of the collectors.

4. The comparators A and B perform a different type of comparison than described in scheme 1, as discussed below.

Furthermore, the contents of the transaction logs and audit trails in scheme 2 differ from the contents of the transaction logs and audit trails in scheme 1.

In scheme 2 at node B, upon start-up of the system 28", the following steps occur:

1. A block of unique TRANIDs is preassigned by the a priori transaction identifier generator B and are stored in the TRANLOG B and in the audit trail B. The records stored in the audit trail B become the tokens.

2. As transactions are received by the consumer B, the preassigned TRANIDs are now assigned to the received transactions.

3. The transactions are posted to the database B.

4. The posted transactions and their respectively assigned TRANIDs are placed in the audit trial.

5. When the first block of TRANIDs has been all assigned, the a priori transaction identifier generator B preassigns another unique block of TRANIDs and stores the new block of TRANIDs in the TRANLOG B and in the audit trail B. The old TRANIDs (which have now been all assigned) in the TRANLOG B are discarded. Steps 2–5 are continually repeated until the system 28' is turned off.

In operation, the collector B continuously reads the records in audit trail B and thereby collects changes made to the database B, and sends these changes to consumer A. Furthermore, in the collector B, the comparator B detects any transactions in the audit trail B which has a TRANID similar to a preassigned TRANID stored in the audit trail token in step 1 above and prevents the collector B from sending to the consumer A any transactions in the audit trail B which were detected as having a TRANID similar to a preassigned TRANID stored in the audit trail token in step 1. In this manner, the database A never receives any transactions that originated within it, since any transactions sent by collector A and received by consumer B are assigned one of the a priori (preassigned) TRANIDs and are thus stopped by the comparator B from being sent back to the consumer A. Any transactions posted to the database B directly by the local input device B are not blocked by the comparator B and thus are sent by the collector B to the consumer A because such transactions either have TRANIDs which do not match any of the a priori (preassigned) TRANIDs stored in the audit trail B or have no TRANID. A similar series of steps is performed in the collector A at node A, thereby preventing transactions which originated in database B from being returned back to node B.

Figure 6:
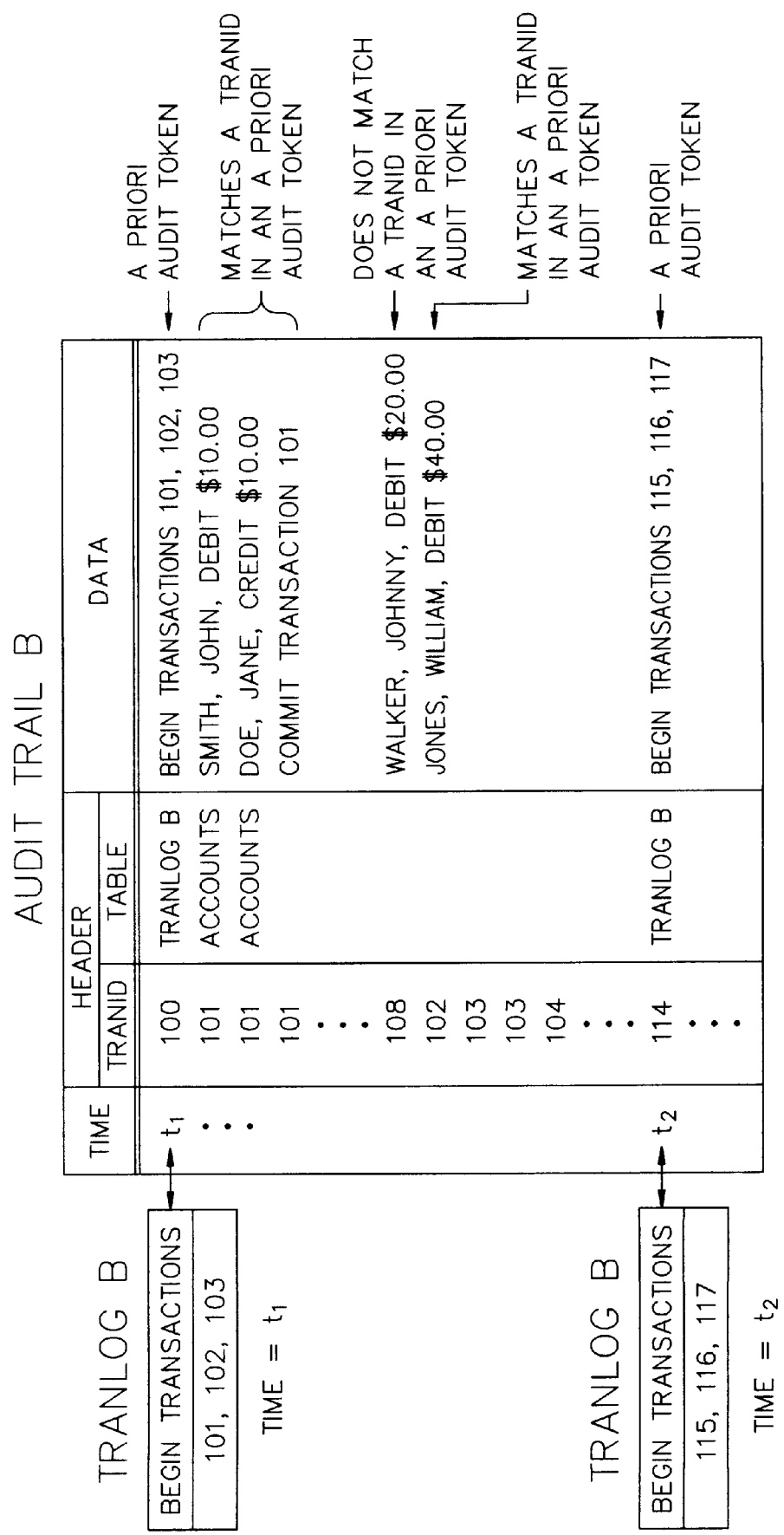
FIG. 6 is a transaction log and an audit trail for use with the scheme of FIG. 5.

FIG. 6 shows an example of a transaction log stored in TRANLOG B at two points in time, $t_1$ and $t_2$, and a portion of the audit trail stored in audit trail B which coincides in time with the transaction log from time $t_1$ through time $t_2$. Unlike the TRANLOG tables in scheme 1, the TRANLOG tables in scheme 2 have only one row which contains only the current block of preassigned TRANIDs. At time $t_1$, a block of TRANIDs (101, 102, 103) are assigned and the audit trail records the a priori audit token "Begin transactions 101, 102, 103." The next three records in the audit trail B are a debit, credit and a commit operation, all initiated by consumer B and assigned (or completed under) a TRANID of 101 by consumer B. Since TRANID 101 exists in an a priori audit token in the audit trail B, the comparator B blocks or filters out all of the transaction data associated with these records, thereby preventing collector B from sending this data to node A. When the comparator B gets to the data associated with TRANID 108, it checks prior audit trail tokens and finds no token which contains TRANID 108. Thus, the comparator B allows the transaction data associated with TRANID 108 (as well as any subsequent transaction data having a TRANID of 108) to be sent to node A. TRANID 108 was not started by consumer B, and thus should not match a TRANID stored in an a priori audit token. The comparator B outputs the following results for subsequent transactions in audit trail B:

TRANID 102: do not send (a priori token exists which contains this TRANID)

TRANID 103: do not send (a priori token exists which contains this TRANID)

TRANID 104: send (a priori token does not exist which contains this TRANID)

At time $t_2$, the consumer B has run out of preassigned TRANIDs and a new batch of TRANIDs (115, 116, 117) are created and stored in the audit trail B as another token. The process continues in the same manner as described above.

Unlike scheme 1, the TRANLOGs in this scheme do not necessarily become larger and larger as more TRANIDs are generated. In this scheme, the TRANLOGs only need to store the current block of preassigned TRANIDs. All previously preassigned (and ultimately assigned) TRANIDs are stored in the audit trails. As a result, the audit trails contain all of the information necessary to perform the transaction ping-pong prevention steps and the collectors do not need to read TRANLOGs. In a like manner, scheme 2 is also easily restartable if some portions of the system 28" go down because all of the information needed to restart the system 28" is contained in the audit trail in the proper order to restart the system. In the example of FIG. 6, the system operator or software only must set the restart point to before $t_1$ to prevent TRANID 101 from ping-ponging. For at least the reasons above, scheme 2 is the preferred embodiment of the present invention.

In scheme 2, the TRANLOG table may also be used to perform a restart in the same manner as described above with respect to scheme 1.

Adding a transaction tracking file (TRANLOG) adds overhead to the consumer process but does not have much impact on the stand-by collector process. The implementation of this transaction tracking file will add, at most, two additional I/O's for each transaction to each consumer. However, large blocks of TRANIDs may be used to greatly reduce the overhead of this file. There are some minor to nil table/file maintenance issues that must be taken into consideration in this solution, but they generally can be automated in this approach. It is highly possible that the stand-by collector can clean up records no longer needed during idle periods if updating the same TRANLOG record is not possible in some databases.

SCHEME 3

PARTITIONING BASED UPON OPERATING SYSTEM RESOURCES

FIG. 7 is a diagram of a bidirectional replication system 28''' in accordance with a third embodiment of the present invention. FIG. 7 is similar to FIG. 2, except for the following differences:

1. The consumers are run by CPUs or processors which have specific identifiers. In FIG. 7, the consumer A is run by a processor 78 (also, referred to herein as "PROCESSOR $A_{CON}$") and the consumer B is run by a processor 80 (also, referred to herein as "PROCESSOR $B_{CON}$").

2. The collectors include detectors which examine transactions in the audit trails to determine processor identifiers, and act on such information, as discussed below. Collector A includes a detector 82 (also referred to herein as "detector A") and the collector B includes a detector 84 (also referred to herein as "detector B").

Furthermore, the contents of the audit trails in scheme 3 differ from the contents of the audit trails in scheme 1.

In scheme 3 at node B, the following steps occur:

1. Any transactions received by consumer B and subsequently posted to database B by the consumer B are appended with the identifier for PROCESSOR $B_{CON}$. Any transactions received by the local input device B and subsequently posted to database B are either appended with an identifier for the processor associated with local input device B (not shown) or are not appended with any processor identifier.

2. The identifiers (if any) in step 1 are included in the audit trail B in association with the respective transactions.

3. The collector B continuously reads audit trail B, collects changes made to the database B, and sends these changes to consumer A. Furthermore, in the collector B, the detector B detects any transactions in the audit trail B which has a processor identifier equal to PROCESSOR $B_{CON}$ and prevents the collector B from sending to the consumer A any transactions in the audit trail B which were detected as having a processor identifier equal to PROCESSOR $B_{CON}$ stored in the audit trail B. In this manner, the database A never receives any transactions that originated within it, since any transactions sent by collector A and received by consumer B are posted as being processed by PROCESSOR $B_{CON}$ and are thus stopped by the comparator B from being sent back to the consumer A. Any transactions posted to the database B directly by the local input device B are not blocked by the comparator B and thus are sent by the collector B to the consumer A because such transactions either have processor identifier other than PROCESSOR $B_{CON}$ or have no processor identifier. A similar series of steps is performed in the collector A at node A, thereby preventing transactions which originated in database B from being returned back to node B.

An alternative version of scheme 3 uses transaction identifiers (TRANIDs) as discussed above, as well as processor identifiers. In this scheme, each transaction processed by the consumer B is assigned a transaction identifier and the audit trail stores the transaction identifiers in the same manner as described in scheme 1. However, the processor identifier is appended to or embedded within the TRANID. Alternatively, the TRANID is encoded with the processor identifier. In step 3 of scheme 3, the detector B extracts or decodes the TRANID to recover the processor identifier which is then examined in the same manner described above to determine if the transaction should be sent to the consumer A for subsequent posting to the database A. Although this alternative scheme uses a TRANID, no comparators or TRANLOGS shown in FIG. 3 are required because the records in the audit trail already contain all of the information that the collectors need to prevent ping-ponging. Again, a similar series of steps is performed in the collector A at node A, thereby preventing transactions which originated in database B from being returned back to node B.

FIG. 8A shows an example of a portion of an audit trail 86 stored in audit trail B which illustrates the concept of storing processor identifiers appended to TRANIDs. In the example of FIG. 8A, audit trail records of transactions originating from the consumer B run in the PROCESSOR $B_{CON}$ have a code "x" appended to, or incorporated into, the TRANID, whereas audit trail records of transactions originating from a processor associated with the local input device B have a code "y" or no code designated by a dash appended to, or incorporated into, the TRANID.

Scheme 3 may be implemented by running all of the consumers in a specific CPU (i.e., processor) or thread (on a multiple CPU or multi-threaded system) with no other applications that modify the database that is the focus of the application. Under these circumstances the collector could automatically eliminate transactions originating in the specified CPU. This approach is very efficient and easy to implement. However, one problem with this approach is that if processes are mistakenly started in the wrong CPU or CPUs, some transactions could ping-pong and the transactions that were supposed to be replicated might get discarded. Scheme 3 may also not be cost effective, since few users are willing to reserve certain processors for replication, particularly if they are not being fully utilized.

SCHEME 4

NATURAL AUDIT TRAIL IDENTIFIER

Scheme 4 shows a fourth embodiment of the present invention and may be explained with reference to FIG. 7, except that the PROCESSOR $A_{CON}$ and PROCESSOR $B_{CON}$ are not necessary. Instead of including the processor identifier in the transaction audit trail, scheme 4 includes the name of the transaction originating process or process ID in the audit trail. Referring to FIG. 7, scheme 4 uses consumer B instead of PROCESSOR $B_{CON}$ for the audit trail entry and in the detection process performed by detector B. That is, the element which originated the transaction becomes part of the audit trail data and becomes the detected element in the collector to identify transactions. Scheme 4 has the same two alternative embodiments as scheme 3 wherein consumer B may be stored as a separate part of the transaction record, or consumer B may be appended to or embedded within a TRANID. An encoding scheme may also be used.

FIG. 8B shows an example of a portion of an audit trail 88 stored in audit trail B which illustrates the concept of storing the originating process or process ID appended to respective TRANIDs. Audit trail records of transactions originating from the consumer B have a code or ID "$CONB" appended to, or incorporated into, the TRANID, whereas audit trail records of transactions originating from the local input device B have a different code "$APP1" appended to, or incorporated into, the TRANID.

Scheme 4 is an efficient and effective solution that only requires some care in starting processes so that ID's or names are properly assigned and notifications are not missed. In operation, a table of process ID's or process names to ignore may be established on the system. When a collector starts, it opens and reads the table and then queries the table again based on an operations signal, such as the Enscribe Control 27 feature when using Shadowbase. There is exposure when a collector goes down and another process receives its process ID's unless a feature is implemented to clean up the table. This is due to the fact that process ID's may be reused. Weaknesses associated with scheme 4 include coordination issues, operator thinking and the occasional need for manual intervention.

SCHEME 5

PARTITIONING BASED UPON AUDIT TRAIL RESOURCES

FIG. 9 is a diagram of a bidirectional replication system 28"'' in accordance with a fifth embodiment of the present invention. FIG. 9 is similar to FIG. 2, except for the following differences:

1. The audit trails A and B (audit trail 34' and audit trail 44', respectively), either are formed as two separate audit trails $A_1$, $A_2$ and $B_1$, $B_2$, or define partitioned segments of single audit trails. The audit trails $A_1$ and $B_1$ contain transactions posted by the local input devices A and B, respectively, whereas the audit trails $A_2$ and $B_2$ contain transactions posted by consumers A and B, respectively.

2. The audit trails A, and B, are connected to, and may be read by, the collectors A and B, respectively, whereas the audit trails $A_2$ and $B_2$ are not connected to, and are not read by, the collectors A and B, respectively.

In scheme 4, at node B, the following steps occur:

1. All transactions originating with the local input device B and posted to the database B are subsequently logged into the audit trail $B_1$ whereas all transactions received by consumer B and posted to the database B are subsequently logged into the audit trail $B_2$.

2. The collector B continuously reads audit trail $B_1$, collects changes made to the database B as reflected in the audit trail $B_1$, and sends these changes to consumer A. The audit trail $B_2$ entries are not read out by the collector B and thus are not sent to the consumer A.

As a result of this process, the database A never receives any transactions that originated within it, since any transactions sent by collector A and received by consumer B are put in the audit trail $B_2$ which is not read or processed by the collector B. (The collector B provides the only path back to node A.) Any transactions posted to the database B directly by the local input device B are read by collector B and thus are sent by the collector B to the consumer A. A similar series of steps is performed at node A, thereby preventing transactions which originated in database B from being returned back to node B.

Scheme 5 may be implemented using either (a) two distinct audit trails for local and consumer transactions (e.g., a master and an auxiliary audit trail), or (b) a single audit trail divided into first and second parts, one part for local transactions and one part for consumer transactions. In the single, divided audit trail implementation, only the local audit trail part is read by the collector. In an alternative scheme, both audit trails or both parts of the single audit trail are read by the collector, but information is provided either within the audit trail or elsewhere to identify the portion of the audit trail(s) which hold consumer transactions. The collector uses this information to select the portions of the audit trail(s) to send to the consumer.

FIG. 10A shows an example of portions of two audit trail 90 and 92 stored in audit trail B which illustrates the concept of separate audit trails for locally initiated transactions and consumer initiated transactions. The transaction data in the audit trails 90 and 92 are identical to the transaction data in single audit trail B shown in FIG. 4.

FIG. 10B shows an example of a portion of a single audit trail 94 stored in audit trail B which is divided into two parts, one part for storing locally initiated transactions and the other part for storing consumer initiated transactions.

SCHEME 6

INTERPROCESS MESSAGING

FIG. 11 is a diagram of a bidirectional replication system 28""' in accordance with a sixth embodiment of the present invention. FIG. 11 is similar to FIG. 2, except for the following differences:

1. An output of consumer B is connected to an input of collector B, and an output of consumer A is connected to an input of collector A.

2. Collector A includes a comparator 96 and collector B includes a comparator 98. Comparators 96 and 98 are referred to interchangeably as "comparator A" and "comparator B," respectively. The outputs of the consumers A and B are connected to one input of the respective comparators A and B, and the outputs of the audit trails A and B are connected via respective collectors A and B to another input of the respective comparators A and B.

In scheme 6 at node B, the following steps occur:

1. Any TRANIDs of transactions assigned by consumer B corresponding to data and subsequently posted to database B by the consumer B are communicated to collector B and stored therein.

2. Collector B continuously reads audit trail B, collects changes made to the database B, and sends these changes to consumer A. In addition, the comparator B detects any TRANIDs of transactions in the audit trail B which were communicated to collector B from consumer B and inhibits the collector B from sending associated transaction records to the consumer A. In this manner, the database A never receives any transaction data that originated within it, since any transactions sent by collector A and received by consumer B (and also subsequently received by collector B) are stopped by the comparator B from being sent back to the consumer A. Any transactions posted to the database B directly by the local input device B are not blocked by the comparator B and thus are sent by the collector B to the consumer A because such transactions would not have been sent by consumer B to collector B. A similar series of steps is performed in the collector A at node A, thereby preventing transactions which originated in database B from being returned back to node B.

Scheme 6 shares similar concepts with schemes 1 and 2 in that all of these schemes compare TRANIDs of transactions processed by consumer B with TRANIDs of such transactions as they appear in the audit trail B. However, scheme 6 does not require maintenance of the TRANLOGs in schemes 1 and 2.

To effectively prevent ping-ponging, consumer B must send a sufficient amount of data about each transaction, such as the transaction TRANIDs, to allow the comparator B to identify similar transaction data read from the audit trail B. Thus, it may not be necessary to send the entire transaction data for each transaction.

Scheme 6 suffers from the same disadvantage as scheme 1 in that the transaction data stored in comparator B of collector B which is received from consumer B become larger and larger as more transaction data are sent. Periodic purging of the transaction data in collector B is risky since some transactions may take a long time to become posted. If transaction data is purged from comparator B and later appears in the audit trail (such as due to a restart), the transaction would not be blocked by the collector B.

Scheme 6 also has disadvantages because if the stand-by replication subsystem is down (for whatever reason), it may impact on the primary replication subsystem. Transaction information becomes lost if the stand-by replication subsystem is down since the transaction information is stored in local process memory and not on disk. Thus, manual operator intervention might be necessary to inform the stand-by subsystem where to begin reading the audit trail records. Such manual operator intervention is undesirable. Also, manual intervention is not sufficient in all cases because information is lost.

The audit trails used in FIG. 11 (scheme 6) are conventional and thus are not described in detail herein.

SCHEME 7

APPLICATION KNOWLEDGE

FIG. 12 is a diagram of a bidirectional replication system 28""'' in accordance with a seventh embodiment of the present invention. FIG. 12 is similar to FIG. 2, except that collector A includes one or more user exits 100 and collector B includes one or more user exits 102, referred to interchangeably as "user exit A" and "user exit B," respectively. As discussed above, a user exit is customer application code that is bound in a consumer to customize data before it is applied to the target database. In this embodiment of the present invention, the user exit analyzes the contents of records of transaction data and uses the results of the analysis to decide whether to forward the records comprising the transactions to the next step in the process (here, the consumer). In this manner, the user exit may eliminate one or more of the data records or complete transactions from being passed to the consumer based upon data record content analysis.

In one embodiment of scheme 7, at least a portion of the transaction data includes information which identifies the node where the data originated. That is, the transaction data itself contains sufficient information to detect where the data originated in the system.

In scheme 7 at node B, the following steps occur:

1. Transactions are received by consumer B and posted to database B by the consumer B. Locally initiated transactions received by the local input device B are also posted to database B.

2. Audit trail B builds a list of all transactions posted to the database A, including all transactions originated from the consumer B and from the local input device B.

3. Collector B continuously reads audit trail B, collects changes made to the database B, and sends these changes to consumer A. In addition, the user exit B detects any transaction records in the audit trail B which have transaction data indicating that the transaction associated with that record originated at node A and inhibits the collector B from sending such transaction records to the consumer A. In this manner, the database A never receives any transaction records that originated within it, since any transaction records sent by collector A and received by consumer B are stopped by the user exit B from being sent back to the consumer A. Any transactions posted to the database B directly by the local input device B are not blocked by the user exit B and thus are sent by the collector B to the consumer A because such transaction records would not have data indicating that the transaction associated with the record originated at node A. In fact, any transactions posted to the database B directly by the local input device B would have data indicating that the transaction associated with the record originated at node B. A similar series of steps is performed in the collector A at node A, thereby preventing transactions which originated in database B from being returned back to node B.

Some examples of scheme 7 are as follows, although the examples are not meant to limit the scope of the invention:

EXAMPLE 1

The transaction data includes customer address data. At node B, all locally entered transactions may be for customers from STATES 1–25, whereas all transactions entered by the consumer B may be for customers from STATES 26–50. The user exit B is programmed to extract the state field from the audit trail B and to inhibit the collector B from sending any transaction records for a transaction to the consumer A which have a row with a state field equal to any of the STATES 26–50. In this manner, the database A never receives any transactions that originated within it, since any transactions sent by collector A and received by consumer B are stopped by the user exit B from being sent back to the consumer A. Any transactions posted to the database B directly by the local input device B are not blocked by the user exit B and thus are sent by the collector B to the consumer A because such transactions do not have a row within a state field equal to any of the STATES 26–50. A similar series of steps is performed in the collector A at node A, thereby preventing transactions which originated in database B from being returned back to node B.

EXAMPLE 2

The transaction data includes reservations data for airline flights on either airline 1 or airline 2. At node B, all locally entered transactions may be for airline 1 reservations, whereas all transactions entered by the consumer B may be for airline 2 reservations. The user exit B is programmed to extract the airline from the audit trail B and to inhibit the collector B from sending any transaction records for a transaction to the consumer A which have a row within a state field equal to airline 2. In this manner, the database A never receives any transactions that originated within it, since any transactions sent by collector A and received by consumer B are stopped by the user exit B from being sent back to the consumer A. Any transactions posted to the database B directly by the local input device B are not blocked by the user exit B and thus are sent by the collector B to the consumer A because such transactions do not have a row within a state field equal to airline 2. A similar series of steps is performed in the collector A at node A, thereby preventing transactions which originated in database B from being returned back to node B.

The audit trails used in FIG. 12 (scheme 7) are conventional and thus are not described in detail herein.

COMBINATION SCHEMES

The transaction tracking file (TRANLOG) used in scheme 2 enables a "Sizzling Hot Stand-By" solution for disaster recovery in a flexible, operating system independent method. However, due to the added overhead of this file, the interprocess message approach of scheme 6 might be implemented in some scenarios. The combination of the two options can be integrated into a solution that can tolerate a stand-by collector going down (e.g., normal shutdown or due to processor failure). For example, while the stand-by collector is operational, interprocess messages would be used from the primary consumer to identify transactions that the collector should ignore. When a stand-by collector is down, the primary consumer writes to the transaction tracking file. Once the stand-by collector is brought back up, it will identify transactions to ignore via the information in the audit trail. However, if a stand-by collector becomes nonoperational after receiving a transaction identifier, the information is lost from memory. This problem may be solved by having the consumer send two messages, one at the start of the transaction and another message at the end of a transaction. If one of these messages doesn't make it to the stand-by collector, the primary system consumer could write the information to the transaction tracking file. When the collector is restarted, it would read into memory all transaction tracking file records to identify what to ignore before reading any audit trail data. Such a solution should have the least impact on bidirectional replication performance while under the interprocess message mode of operation. It is believed that these interprocess messages, between the primary consumer and stand-by collector, should only take minimum operating resources per message.

ALTERNATIVE ARRANGEMENT OF ELEMENTS IN SCHEMES 1–7

The detecting and inhibiting processes described in the various schemes above may occur at either node by merely rearranging the connections between elements. Also, the functions of the collectors and consumers may be consolidated into a single program object or element. In the case of a single database having plural files or tables, no nodes exist and all functions of the collectors and consumers occur in one physical location. The following examples illustrate different configurations which are within the scope of the invention:

1. Schemes 1 and 2

The function of comparator B is performed in consumer A and/or the function of comparator A is performed in consumer B. In this embodiment, the collectors send all of the transactions to the respective consumers but the originally sent transactions are detected and inhibited from being posted by a consumer located at the same node that the database resides. This scheme increases traffic on the communication media 58 and 60 and requires that the outputs of the TRANLOGs be connected to inputs of the respective consumers. However, in some situations, this scheme may be easier to implement or may use less target resources than performing comparator functions in the collectors. Also, this scheme prevents any transaction from being duplicately applied if the update to the TRANLOG file is done as part of the transaction applying database deltas to the target tables.

All Schemes

The collectors may originate the transactions on behalf of the consumers.

Schemes 1 and 2

The TRANLOGs may be incorporated into the collectors. The comparators and comparator functions may be performed in the consumers.

Scheme 3

The detectors may be part of the consumers, instead of part of the collectors.

Scheme 5

The collectors, instead of the consumers, may append identification information to transactions, and the audit trails may be separated according to whether the transactions are tagged with a consumer identification or whether the transactions are locally received.

Scheme 6

The comparators and comparator functions may be performed in the consumers.

Scheme 7

The user exits may run in the consumers, instead of the collectors. However, this approach increases overhead going back to the primary system.

DATA TRANSFORMATION

The scope of the present invention also includes schemes which perform transformation of data, instead of strict replication. Examples of transformations include:

1. Replicating Enscribe source data to SQL target tables.
2. Eliminating or adding columns or rows in a target.
3. Combining records from two source files or tables and writing them into one target file or table.
4. Changing the type or length of a field.
5. Taking one source record and writing one target record for each occurrence of a particular field (e.g., data normalization).
6. Writing a source record to a target only when a field contains a specific value (conditional replication). When using Shadowbase, some of these forms of transformation require user exits.

MULTIPLE NODE SYSTEMS HAVING MORE THAN TWO NODES

Figure 13:
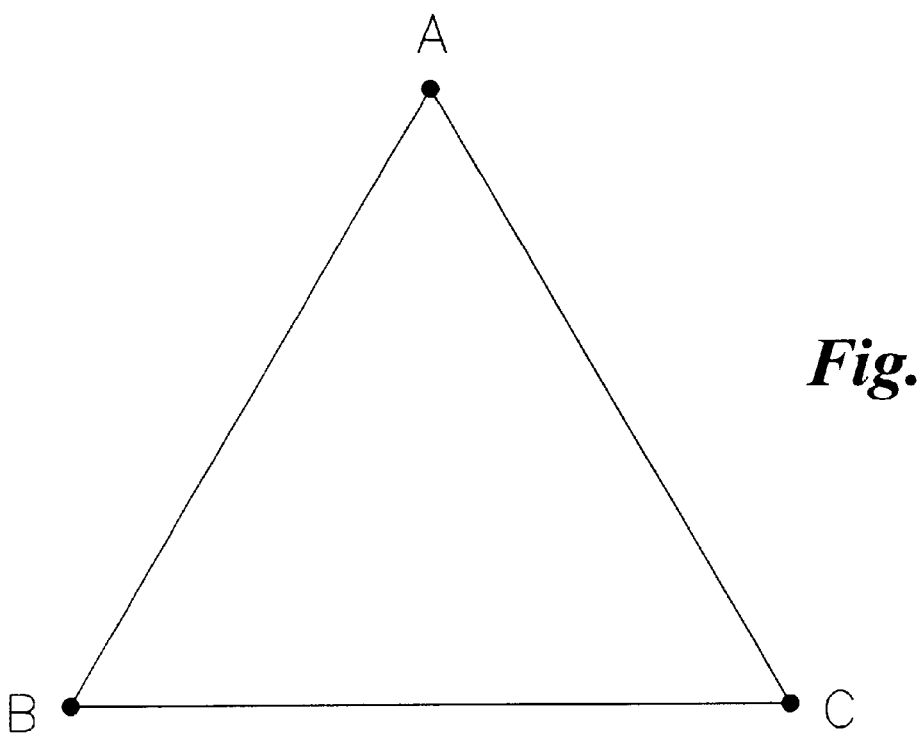
FIG. 13 is a triangular node configuration.

The principles described above are equally applicable to systems having more than two nodes. Consider, for example, a triple redundant database scheme having a triangular node configuration of nodes A, B and C, as shown in FIG. 13. In operation, node A sends posted transactions to nodes B and C, node B sends posted transactions to nodes A and C, and node C sends posted transactions to nodes A and B. Thus, transactions originated at node A are sent by node A to node B, which, in turn, sends the transaction to node C. However, node C previously received the transaction directly from node A. Therefore, node C receives redundant information. The same problem exists with respect to nodes A and B for transactions originating at nodes B and C.

Figure 14:
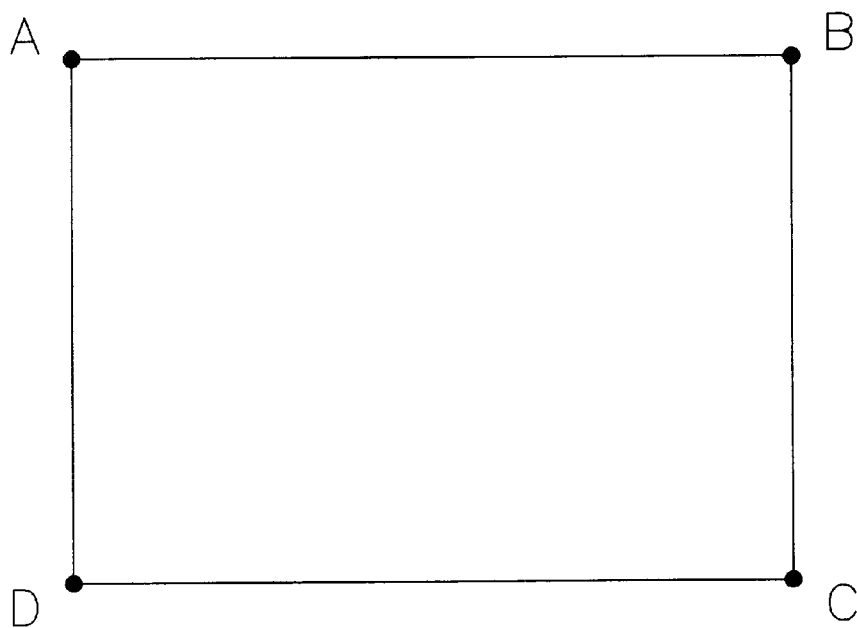
FIG. 14 is a rectangular node configuration.

Consider another example having a rectangular node configuration of nodes A, B, C and D, as shown in FIG. 14. In operation, node A sends posted transactions to nodes B and D, node B sends posted transactions to nodes A and C, node D sends posted transactions to nodes A and C, and node C sends posted transactions to nodes D and B. Thus, transactions originated at node A are sent by node A to node B, which, in turn, sends the transaction to node C, which, in turn, sends the transaction to node D. However, node D previously received the transaction directly from node A. Therefore, node D receives redundant information. The same problem exists with respect to nodes A, B and C for transactions originating at nodes B, C and D.

The problem of adjacent nodes replicating back to each other may be addressed by any of the schemes described above. However, the problem of nodes receiving redundant transactions must be addressed by additional elements and steps.

HOP NUMBER DETECTION

One scheme for preventing nodes from receiving redundant information in accordance with the present invention is to track the number of "hops" and to use that number in the comparators as a metric to prevent further sending of the transaction. A portion of the transaction record, such as the header, may be used for this purpose. In FIGS. 13 and 14, sending a transaction from one node to another node is referred to as one "hop." Thus, sending a transaction from node A to node B requires one hop, whereas sending a transaction from node A to node B to node C requires two hops. The hop number may be incremented by consumers, collectors or other system components at the respective nodes.

In the example of FIG. 13, the system prevents further sending of any transactions or rows which have a hop value or hop number equal to 1 (where the numbering is zerorelative). In the example of FIG. 14, the system prevents further sending of any transaction which has a hop number equal to 2. Other examples of node topologies or configurations are within the scope of the invention wherein the specific node topology or configuration determines the hop number.

Figure 15:
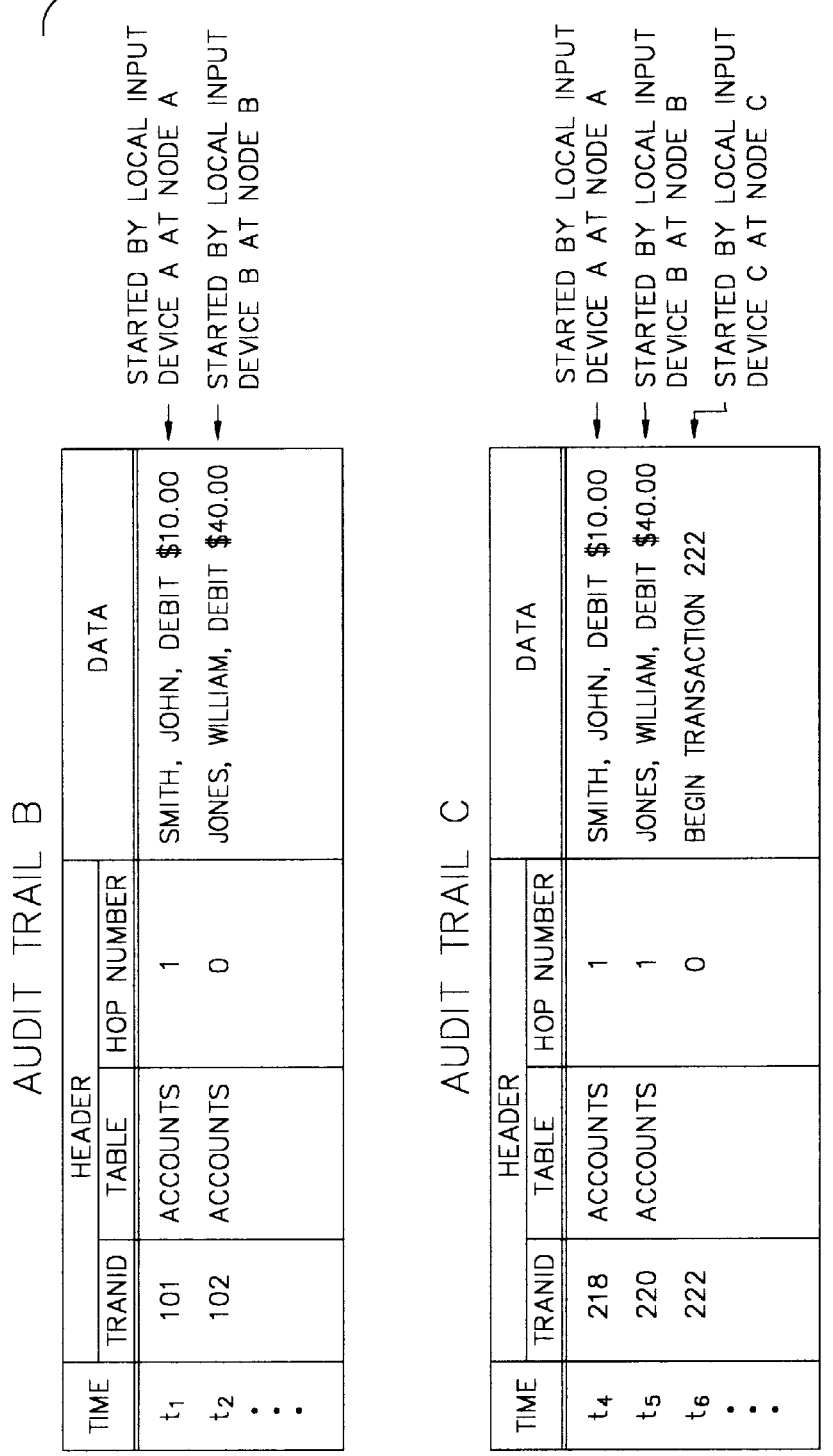
FIG. 15 shows audit trails for use with the node configurations of FIGS. 13 and 14.

FIG. 15 shows a portion of audit trail B and audit trail C for the triangular node configuration of FIG. 13 in an example wherein node A is located in New York, node B is located in Los Angeles, and node C is located in Colorado. The header includes an additional field for the hop number. Consider the audit trail B entry at time $t_1$ which relates to a debit operation for customer Smith that originated at node A. Accordingly, the hop number is 1. Since the hop number is 1, this data is not sent to node C because node C should have already received this data directly from node A. See the debit entry at time $t_4$ in audit trail C for customer Smith and which also has a hop number of 1. Referring again to audit trail B, the entry at time $t_2$ relates to a debit operation for customer Jones that originated at node B. Accordingly, the hop number is 0. Since the hop number is 0, this data is sent to nodes A and C. At node C this data appears in the audit trail C with a hop number of 1, as shown in the time $t_5$ entry.

Alternative embodiments of multiple node systems include the following schemes:

1. In the example shown in FIG. 15, transactions having a hop number of 0 or 1 are sent to the other nodes and the individual nodes use these hop numbers to determine whether to post the transactions. Any transactions which are received at a node with a hop number of 1 and which now have a new hop number of 2 would not be posted and thus would not be further propagated through the network of nodes.

2. The transaction header is tagged with originating node information which is used by the nodes to determine whether to post and send the transaction. In the example of FIG. 15, node B posts any transactions originated by nodes A or C, but does not send to node C any transactions that originated in node A and does not send to node A any transactions that originated in node C.

3. The application knowledge scheme described above (scheme 7) is used to identify the originating node based upon the data within each transaction record. The originating node information is used in the same manner as alternative embodiment 2 described immediately above to make send/no send decisions.

4. A list of applied nodes is appended to the transaction data that is sent between nodes. When a node receives a transaction with such a list, it looks at the list and forwards the transaction to any connected nodes that have not applied the transaction. If a node B, for example, does not see node C on the applied list, and node B is connected to node C, then node B will send the transaction data to node C. Node C will apply the transaction as well as update the applied list to reflect that node C has processed the transaction before forwarding the transaction onward to other nodes.

5. A list of both recipient and applied nodes is appended to the transaction that is sent between nodes. When a node receives a transaction with such a list, it looks at the list and determines if it is connected to any of the recipients and if the connected nodes have applied the transaction. If a node B, for example, sees node C on the recipient list, and not on the applied list, and node B is connected to node C, then node B will send the transaction data to node C. Node C will apply the transaction as well as update the applied list to reflect that node C has processed the transaction before forwarding the transaction onward to other nodes.

SELECTIVE PING-PONGING SCHEME FOR REPLICATION VERIFICATION

Schemes 1–7 described above allow for bidirectional replication without ping-ponging.

It is further desirable to verify that certain transactions posted to a database at one node were actually received and posted (i.e., properly replicated) to a database at another node. For example, referring to FIG. 2, it would be desirable to verify that a transaction which was originally posted to database A is actually posted to database B, and vice versa. The schemes described above function to inhibit transactions which originate at database A from being reposted to database B. When the collectors perform the filtering or blocking of return transactions, node A never receives any information to allow it to confirm proper replication. Even when the consumers perform the filtering or blocking, the consumers do not reconcile the filtered or blocked transactions with the transactions in the database A to inform the database A as to which database A-originated transactions were properly replicated and which database A-originated transactions were not properly replicated. Furthermore, certain transactions which are not critical to system operation may not require replication verification. Consider an example wherein replication verification is desired for debits and credits posted to a database, but no replication verification is desired for inquiries logged to a database regarding an account balance. Thus, it is desirable to provide a scheme which allows for "selective ping-ponging" of particular types of transactions. The present invention described below provides such a scheme.

Selective ping-ponging is thus defined as allowing a certain amount of ping-pong to occur on purpose. A typical reason is to verify that the target database has, in fact, processed the update. To implement selective ping-ponging, some indicia of the source transaction must be sent back, such as the whole transaction, certain rows of the transaction, or even just the original source system TRANID.

Figure 16:
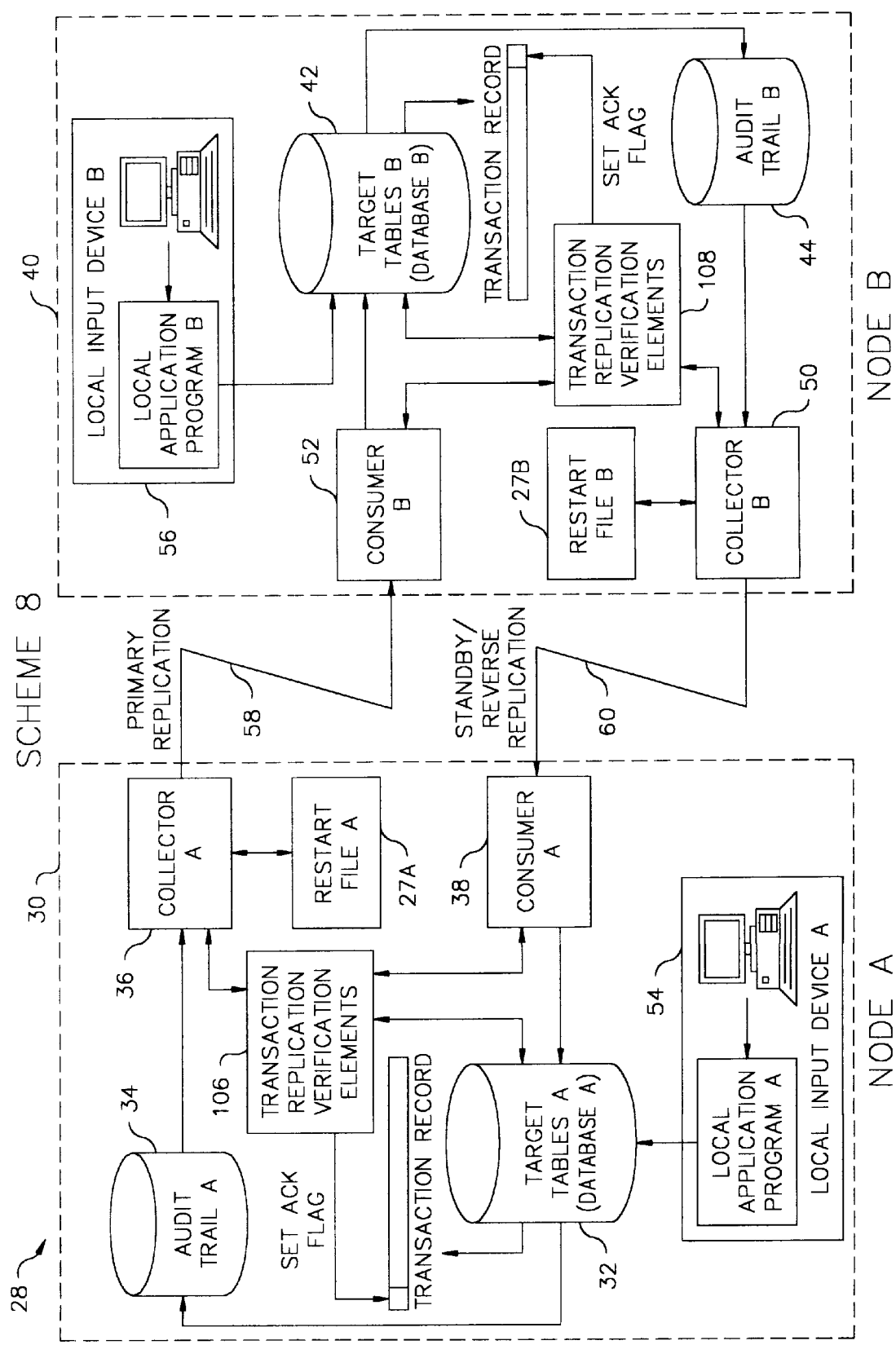
FIG. 16 is a schematic block diagram of a bidirectional data replication system in accordance with an eighth scheme of the present invention which allows for selective ping-ponging.

FIG. 16 shows an eighth scheme of the present invention which allows for bidirectional replication with selective ping-ponging.

The replication verification scheme is preferably implemented by running the filtering or blocking functions (e.g., comparators in FIGS. 3, 5 and 11, detector in FIG. 7, user exits in FIG. 12) in the source consumers because the source consumers typically have easier and quicker access to the source database than the target collectors. Alternatively, the filtering or blocking functions may be implemented in an application program associated with the source or originating database.

Referring to FIG. 16, one selective ping-pong, replication verification scheme for use at node A operates as follows:

1. Transactions which are posted by local input device B are identified by transaction replication verification elements 108 as transactions which should undergo replication verification (ping-ponging allowed) or transactions which should not undergo replication verification (ping-ponging not allowed). The source collector (collector A in this example) or a user application associated with the local input device B marks the identified transactions in some manner as being selected for ping-pong. In one scheme, the consumers are written with user exits to use transaction data content or the table names being updated not to filter selective transactions, rows, or data such as the TRANID.

2. For the transactions which are identified and/or marked as transactions for which ping-ponging is allowed, the filtering or blocking schemes described in any of the schemes 1–7 (not shown in FIG. 16) which are running at either nodes A or B are disabled. The originating database, here database B, reacts in at least one of the following ways when the transaction gets returned:

a. The originally posted transaction is compared to the ping-ponged version by transaction replication verification elements 108 to determine if both versions are identical. Any discrepancies between the versions are investigated by special programs or the system operator.

b. An acknowledgment flag associated with the posted transaction is set, thereby indicating that the posted transaction has been properly replicated in the remote database. To prevent further propagation of the transaction through the system, transactions which have "set" acknowledgment flags are not replicated again.

3. For the transactions which are identified as transaction for which ping-ponging is not allowed, the filtering or blocking functions described in any of the schemes 1–7 operate in the normal manner to block reposting of the transactions.

As noted above, in selective ping-ponging, some indicia of the source transaction must be sent back, such as the whole transaction, certain rows of the transaction, or even just the original source system TRANID. If whole transactions or certain rows of transactions are returned, the system can do transaction comparisons using transaction data obtained from target tables or collectors. If only TRANIDs are returned, the system does comparisons using TRANIDs stored in either collectors or TRANLOGs (not shown in FIG. 16).

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of selectively preventing transaction ping-pong in a bidirectional database replication system including (i) a first database and (ii) a second database, the system further including (iii) a first transaction transmitter which sends transactions posted to the first database to the second database for replication in the second database, and (iv) a second transaction transmitter which sends transactions posted to the second database to the first database for replication in the first database only after the transactions are actually posted to the second database, each transaction being one or more transaction steps or transaction operations, the method comprising:
   (a) detecting all transactions to be posted to the second database that were sent by the first transaction transmitter; and
   (b) inhibiting the first database from posting selective transactions which were detected as being originally sent by the first transaction transmitter, wherein any transaction sent by the second transaction transmitter is replicated in the first database only after the transaction is actually posted to the second database.

2. A method according to claim 1 wherein the first database and the first transaction transmitter are at a first location, and the second database and the second transaction transmitter are at a second location remote from the first location, and the detecting step occurs at the second location.

3. A method according to claim 1 wherein the inhibiting step is performed by the second transaction transmitter which prevents the sending of selective transactions to the first database which were originally sent by the first transaction transmitter to the second database.

4. A method according to claim 1 wherein the system further includes (v) a first transaction receiver which receives transactions sent by the second transaction transmitter for posting to the first database, and (vi) a second transaction receiver which receives transactions sent by the first transaction transmitter for posting to the second database, the inhibiting step being performed by the first transaction receiver.

5. A method according to claim 4 wherein the first transaction transmitter is a first collector, the second transaction transmitter is a second collector, the first transaction receiver is a first consumer and the second transaction receiver is a second consumer.

6. A method according to claim 1 wherein the first and second databases define respective first and second tables of the same database located in the same physical location and the method allows for replication to the same database.

7. A method according to claim 1 wherein the first and second databases define respective first and second records of the same database located in the same physical location and the method allows for replication to the same database.

8. A method according to claim 1 wherein step (b) comprises inhibiting the first database from posting all transactions which were detected as being originally sent by the first transaction transmitter.

9. A method according to claim 1 further comprising:
   (c) identifying transactions posted to the first database which should be returned to the first database for replication confirmation and transactions posted to the first database which should not be returned to the first database for replication confirmation, wherein the inhibiting step further comprises inhibiting the first database from posting only those transactions which were identified as those which should not be returned to the first database for replication confirmation.

10. A method according to claim 9 wherein the first database includes indicia of replication confirmation for each transaction identified in step (c) for which replication confirmation is desired, the method further comprising:
   (d) posting a change to the replication confirmation indicia when posting transactions which were identified as those which should be returned to the first database.

11. A method according to claim 1 wherein the system further includes (v) a second transaction receiver which receives transactions sent by the first transaction transmitter for posting to the second database, (vi) a transaction log associated with the second database, and (vii) an audit trail of all transactions posted to the second database, the method further comprising:
   (c) assigning a transaction identifier to every transaction received by the second transaction receiver which is posted to the second database;
   (d) posting the transactions received by second transaction receiver in the second database and creating an audit trail of the posted transactions;
   (e) storing the assigned transaction identifiers in the transaction log and associating the assigned transaction identifiers with the transactions in the audit trail; and
   (f) the second transaction transmitter sending the transactions in the audit trail for posting to the first database, wherein the detecting step (a) comprises detecting selective transactions in the audit trail which have a transaction identifier similar to a transaction identifier in the transaction log, and the inhibiting step (b) comprises inhibiting the first database from posting to the first database selective transactions in the audit trail which were detected as having a transaction identifier similar to a transaction identifier in the transaction log.

12. A method according to claim 11 wherein the inhibiting step (b) further comprises preventing the second transaction transmitter from sending to the first database selective transactions in the audit trail which were detected as having a transaction identifier similar to a transaction identifier in the transaction log.

13. A method according to claim 12 wherein the system further includes (viii) a first transaction receiver which receives transactions sent by the second transaction transmitter for posting to the first database, (ix) a transaction log associated with the first database, and (x) an audit trail of all transactions posted to the first database, the method further comprising:
   (g) assigning a transaction identifier to every transaction received by the first transaction receiver which is posted to the first database;
   (h) posting the transactions received by first transaction receiver in the first database and creating an audit trail of the transactions posted to the first database;
   (i) storing the transaction identifiers assigned in step (g) in the transaction log associated with the first database and associating the transaction identifiers assigned in step (g) with the transactions in the audit trail of transactions posted to the first database;

(j) the first transaction transmitter sending the transactions in the audit trail of transactions posted to the first database for posting to the second database;

(k) detecting all transactions to be posted to the first database that were sent by the second transaction transmitter; and (l) inhibiting the second database from posting selective transactions which were detected as being originally sent by the second transaction transmitter, wherein the detecting step (k) comprises detecting selective transactions in the audit trail of transactions posted to the first database which have a transaction identifier similar to a transaction identifier in the transaction log associated with the first database, and the inhibiting step (l) comprises inhibiting the second database from posting to the second database selective transactions in the audit trail of transactions posted to the first database which were detected as having a transaction identifier similar to a transaction identifier in the transaction log associated with the first database.

14. A method according to claim 1 wherein the system further includes (v) a second transaction receiver which receives transactions sent by the first transaction transmitter for posting to the second database, (vi) a transaction log associated with the second database, and (vii) an audit trail of all transactions posted to the second database, the method further comprising:

(c) preassigning a block of unique transaction identifiers for transactions subsequently received by the second transaction receiver;

(d) storing the preassigned block of unique transaction identifiers in the audit trail and in the transaction log;

(e) assigning one of the preassigned unique transaction identifiers in the transaction log to each transaction subsequently received by the second transaction receiver;

(f) posting the transactions received by the second transaction receiver in the second database and creating an audit trail of the posted transactions, the audit trail including the assigned transaction identifiers; and (g) the second transaction transmitter sending the transactions in the audit trail for posting to the first database, wherein the detecting step (a) comprises detecting selective transactions in the audit trail which have a transaction identifier similar to a preassigned transaction identifier stored in the audit trail in step (d), and the inhibiting step (b) comprises inhibiting the first database from posting to the first database selective transactions in the audit trail which were detected as having a transaction identifier similar to a preassigned transaction identifier stored in the audit trail in step (d).

15. A method according to claim 14 wherein the inhibiting step (b) further comprises preventing the second transaction transmitter from sending to the first database selective transactions in the audit trail which were detected as having a transaction identifier similar to a preassigned transaction identifier stored in the audit trail in step (d).

16. A method according to claim 14 wherein steps (c) and (d) are repeated whenever the transaction log has assigned all of the previously preassigned unique transaction identifiers, the audit trail thereby containing all of the preassigned transaction identifiers.

17. A method according to claim 1 wherein the system further includes (v) a second transaction receiver which receives transactions sent by the first transaction transmitter, (vi) a second processor which posts the transactions received by the second transaction receiver to the second database, the second processor including a second processor identifier, and (vii) an audit trail of all transactions posted to the second database, the method further comprising:

(c) the second processor posting the transactions received by the second transaction receiver in the second database and creating an audit trail of the posted transactions, the audit trail including the second processor identifier; and (d) the second transaction transmitter sending the transactions in the audit trail to the first database for posting to the first database, wherein the detecting step (a) comprises detecting selective transactions which are in the audit trail of the second database and which include the second processor identifier, and the inhibiting step (b) comprises preventing the first database from posting selective transactions which were detected as being in the audit trail of the second database and which include the second processor identifier.

18. A method according to claim 17 wherein the inhibiting step (b) further comprises preventing the second transaction transmitter from sending to the first database selective transactions which are in the audit trail of the second database and which include the second processor identifier.

19. A method according to claim 17 further comprising:

(e) assigning a transaction identifier to every transaction received by the second transaction receiver which is posted to the second database, the transaction identifier including the second processor identifier; and (f) storing the assigned transaction identifiers in the audit trail in association with the respective transactions, wherein the inhibiting step (b) comprises preventing the first database from posting selective transactions which are in the audit trail of the second database and which include the second processor identifier as part of the transaction identifier.

20. A method according to claim 1 wherein the system further includes (v) a second transaction receiver which receives transactions sent by the first transaction transmitter, the second transaction receiver including a second transaction receiver identifier, and (vi) an audit trail of all transactions posted to the second database, the method further comprising:

(c) the second transaction receiver posting the transactions which it receives in the second database and creating an audit trail of the posted transactions, the audit trail including the second transaction receiver identifier; and (d) the second transaction transmitter sending the transactions in the audit trail to the first database for posting to the first database, wherein the detecting step (a) comprises detecting selective transactions which are in the audit trail of the second database and which include the second transaction receiver identifier, and the inhibiting step (b) comprises preventing the first database from posting a selective transactions which were detected as being in the audit trail of the second database and which include the second transaction receiver identifier.

21. A method according to claim 20 wherein the inhibiting step (b) further comprises preventing the second transaction transmitter from sending to the first database selective transactions which are in the audit trail of the second database and which include the second transaction receiver identifier.

22. A method according to claim 20 further comprising:
 (e) assigning a transaction identifier to every transaction received by the second transaction receiver which is posted to the second database, the transaction identifier including the second transaction receiver identifier; and
 (f) storing the assigned transaction identifiers in the audit trail in association with the respective transactions,
 wherein the inhibiting step (b) comprises preventing the first database from posting selective transactions which are in the audit trail of the second database and which include the second transaction receiver identifier as part of the transaction identifier.

23. A method according to claim 1 wherein the system further includes (v) an audit trail of all transactions posted to the second database, the audit trail including a first audit trail containing all transactions posted to the second database which were sent by the first transaction transmitter, and a second audit trail containing all transactions posted to the second database which were not sent by the first transaction transmitter, the method further comprising:
 (c) posting to the second database all transactions sent by the first transaction transmitter and creating an audit trail of the posted transactions in the first audit trail;
 (d) posting to the second database all transactions not sent by the first transaction transmitter and creating an audit trail of the posted transactions in the second audit trail; and
 (e) the second transaction transmitter sending the transactions in the audit trail to the first database for posting to the first database,
 wherein the detecting step (a) comprises identifying selective transactions which are in the first audit trail of the second database, and the inhibiting step (b) comprises preventing the first database from posting selective transactions which were identified as being in the first audit trail of the second database.

24. A method according to claim 23 wherein the system further includes (vi) a second transaction receiver which receives transactions sent by the first transaction transmitter, wherein step (c) further includes the second transaction receiver posting the transactions which it receives in the second database and creating an audit trail of the posted transactions in the first audit trail; and
 wherein step (e) includes the second transaction transmitter sending the transactions in the audit trail to the first database for posting to the first database,
 wherein the inhibiting step (b) comprises preventing the second transaction transmitter from sending to the first database selective transactions which are in the first audit trail of the second database.

25. A method according to claim 23 wherein the inhibiting step (b) further comprises preventing the second transaction transmitter from sending to the first database selective transactions which are in the first audit trail of the second database.

26. A method according to claim 23 wherein the audit trail is a single audit trail and the first and second audit trails are respective first and second parts of the single audit trail.

27. A method according to claim 1 wherein the system further includes (v) a second transaction receiver which receives transactions sent by the first transaction transmitter for posting to the second database, and (vi) an audit trail of all transactions posted to the second database, the method further comprising:
 (c) posting the transactions received by the second transaction receiver in the second database and creating an audit trail of the posted transactions;
 (d) communicating the transactions received by the second transaction receiver to the second transaction transmitter; and
 (e) the second transaction transmitter sending the transactions in the audit trail to the first database for posting to the first database,
 wherein the detecting step (a) comprises detecting selective transactions in the audit trail which were communicated to the second transaction transmitter in step (d), and the inhibiting step (b) comprises preventing the second transaction transmitter from sending to the first database selective transactions in the audit trail which were detected as being communicated to the second transaction transmitter.

28. A method according to claim 1 wherein each of the transactions include transaction data which is usable to identify the origin of the transaction, the system further including (v) an audit trail of all transactions posted to the second database, and (vi) application code which interprets the transaction data within posted transactions for identifying the origin of the transaction, thereby identifying the originally posted database of the transaction, the method further comprising:
 (c) posting to the second database selective transactions sent by the first transaction transmitter and creating an audit trail of the posted transactions;
 (d) the second transaction transmitter sending the transactions in the audit trail to the first database for posting to the first database; and
 (e) executing the application code on all transactions read out of the audit trail for sending to the first database,
 wherein the detecting step (a) comprises the application code identifying selective transactions which originated at the first database, and the inhibiting step (b) comprises preventing the first database from posting selective transactions which were identified by the application code as having originated at the first database.

29. A method according to claim 28 wherein the inhibiting step (b) further comprises preventing the second transaction transmitter from sending to the first database selective transactions which were identified by the application code as having originated at the first database.

30. A method of selectively preventing transaction ping-pong in a bidirectional database replication system including a plurality of nodes connected via communication media in a topology, each node including a database and a transaction transmitter which sends transactions posted to the database to a database at one or more other nodes for replication in the databases of the one or more other nodes only after the transactions are actually posted to the database of the sending node, each transaction being one or more transaction steps or transaction operations, the method comprising:
 (a) detecting all transactions to be posted to databases in remote nodes that were sent by a local node; and
 (b) inhibiting the database at the local node from posting selective transactions which were detected as being originally sent by the local node, wherein any transaction sent by a transaction transmitter of a node is replicated in the databases of the one or more other nodes only after the transaction is actually posted to the database of the sending node.

31. A method according to claim 30 wherein the transactions are stored within transaction records, the transaction records including indicia of how many nodes the transaction has replicated to, and step (b) )further includes inhibiting the database at the local node from posting selective transactions which were detected as being originally sent by the local node by virtue of having indicia that the transaction has replicated to a predetermined number of nodes.

32. A method according to claim 30 wherein each of the transactions include transaction data which is usable to identify the origin of the transaction, the system further including application code which interprets the transaction data within posted transactions for identifying the origin of the transaction, thereby identifying the originally posted database of the transaction, and step (b) further includes inhibiting the database at the local node from posting selective transactions which were detected as being originally sent by a node having a predetermined origin.

33. A method according to claim 30 wherein the inhibiting step is performed by a remote note which prevents the sending of any transactions to the local node which were detected as being originally sent by the local node to one or more remote nodes.

34. A system for selectively preventing transaction ping-pong in a bidirectional database replication system which includes a plurality of nodes connected via communication media in a topology, each node including a database and a transaction transmitter which sends transactions posted to the database to a database at one or more other nodes for replication in the databases of the one or more other nodes only after the transactions are actually posted to the database of the sending node, each transaction being one or more transaction steps or transaction operations, the system comprising:
   (a) means for detecting all transactions to be posted to databases in remote nodes that were sent by a local node; and
   (b) means for inhibiting the database at the local node from posting selective transactions which were detected as being originally sent by the local node, wherein any transaction sent by a transaction transmitter of a node is replicated in the databases of the one or more other nodes only after the transaction is actually posted to the database of the sending node.

35. A system according to claim 34 wherein the transactions are stored within transaction records, the transaction records including indicia of how many nodes the transaction has replicated to, and the means for inhibiting inhibits the database at the local node from posting selective transactions which were detected as being originally sent by the local node by virtue of having indicia that the transaction has replicated to a predetermined number of nodes.

36. A system for selectively preventing transaction ping-pong in a bidirectional database replication system which includes (i) a first database and (ii) a second database, the system further including (iii) a first transaction transmitter which sends transactions posted to the first database to the second database for replication in the second database, and (iv) a second transaction transmitter which sends transactions posted to the second database to the first database for replication in the first database only after the transactions are actually posted to the second database, each transaction being one or more transaction steps or transaction operations, the system for selectively preventing transaction ping-pong comprising:
   (a) means for detecting all transactions to be posted to the second database that were sent by the first transaction transmitter; and
   (b) means for inhibiting the first database from posting selective transactions which were detected as being originally sent by the first transaction transmitter, wherein any transaction sent by the second transaction transmitter is replicated in the first database only after the transaction is actually posted to the second database.

37. A system according to claim 36 wherein the first database and the first transaction transmitter are at a first location, and the second database and the second transaction transmitter are at a second location remote from the first location, and the means for detecting is located at the second location.

38. A system according to claim 36 wherein the means for inhibiting is located in the second transaction transmitter, thereby preventing the sending of selective transactions to the first database which were originally sent by the first transaction transmitter to the second database.

39. A system according to claim 36 wherein the bidirectional database replication system further includes (v) a first transaction receiver which receives transactions sent by the second transaction transmitter for posting to the first database, and (vi) a second transaction receiver which receives transactions sent by the first transaction transmitter for posting to the second database, the means for inhibiting being located in the first transaction receiver.

40. A system according to claim 39 wherein the first transaction transmitter is a first collector, the second transaction transmitter is a second collector, the first transaction receiver is a first consumer and the second transaction receiver is a second consumer.

41. A system according to claim 36 wherein the first and second databases define respective first and second tables of the same database located in the same physical location and the system allows for replication to the same database.

42. A system according to claim 36 wherein the first and second databases define respective first and second records of the same database located in the same physical location and the system allows for replication to the same database.

43. A system according to claim 36 wherein the means for inhibiting inhibits the first database from posting all transactions which were detected as being originally sent by the first transaction transmitter.

44. A system according to claim 36 further comprising:
   (c) means for identifying transactions posted to the first database which should be returned to the first database for replication confirmation and transactions posted to the first database which should not be returned to the first database for replication confirmation, wherein the means for inhibiting inhibits the first database from posting only those transactions which were identified as those which should not be returned to the first database for replication confirmation.

45. A system according to claim 44 wherein the first database includes indicia of replication confirmation for each transaction identified by the means for identifing for which replication confirmation is desired, the system further comprising:
   (d) means for posting a change to the replication confirmation indicia when posting transactions which were identified as those which should be returned to the first database.

46. A system according to claim 36 wherein the bidirectional database replication system further includes (v) a second transaction receiver which receives transactions sent by the first transaction transmitter for posting to the second database, (vi) a transaction log associated with the second database, and (vii) an audit trail of all transactions posted to the second database, the system for selectively preventing transaction ping-pong further comprising:

(c) means for assigning a transaction identifier to every transaction received by the second transaction receiver which is posted to the second database;

(d) means for posting the transactions received by second transaction receiver in the second database and creating an audit trail of the posted transactions; and (e) means for storing the assigned transaction identifiers in the transaction log and associating the assigned transaction identifiers with the transactions in the audit trail, wherein the second transaction transmitter sends the transactions in the audit trail for posting to the first database, and wherein the means for detecting detects selective transactions in the audit trail which have a transaction identifier similar to a transaction identifier in the transaction log, and the means for inhibiting inhibits the first database from posting to the first database selective transactions in the audit trail which were detected as having a transaction identifier similar to a transaction identifier in the transaction log.

47. A system according to claim 46 wherein the means for inhibiting prevents the second transaction transmitter from sending to the first database selective transactions in the audit trail which were detected as having a transaction identifier similar to a transaction identifier in the transaction log.

48. A system according to claim 47 wherein the bidirectional database replication system further includes (viii) a first transaction receiver which receives transactions sent by the second transaction transmitter for posting to the first database, (ix) a transaction log associated with the first database, and (x) an audit trail of all transactions posted to the first database, the first transaction transmitter sending the transactions in the audit trail of transactions posted to the first database for posting to the second database, the system for selectively preventing transaction ping-pong further comprising:

(f) means for assigning a transaction identifier to every transaction received by the first transaction receiver which is posted to the first database;

(g) means for posting the transactions received by first transaction receiver in the first database and creating an audit trail of the transactions posted to the first database;

(h) means for storing the assigned transaction identifiers in the transaction log associated with the first database and associating the transaction identifiers assigned by the means for assigning with the transactions in the audit trail of transactions posted to the first database;

(i) means for detecting all transactions to be posted to the first database that were sent by the second transaction transmitter; and (j) means for inhibiting the second database from posting selective transactions which were detected as being originally sent by the second transaction transmitter, wherein the means for detecting detects selective transactions in the audit trail of transactions posted to the first database which have a transaction identifier similar to a transaction identifier in the transaction log associated with the first database, and the means for inhibiting inhibits the second database from posting to the second database selective transactions in the audit trail of transactions posted to the first database which were detected as having a transaction identifier similar to a transaction identifier in the transaction log associated with the first database.

49. A system according to claim 36 wherein the bidirectional database replication system further includes (v) a second transaction receiver which receives transactions sent by the first transaction transmitter for posting to the second database, (vi) a transaction log associated with the second database, and (vii) an audit trail of all transactions posted to the second database, the second transaction transmitter sending the transactions in the audit trail for posting to the first database, the system for selectively preventing transaction ping-pong further comprising:

(c) means for preassigning a block of unique transaction identifiers for transactions subsequently received by the second transaction receiver;

(d) means for storing the preassigned block of unique transaction identifiers in the audit trail and in the transaction log;

(e) means for assigning one of the preassigned unique transaction identifiers in the transaction log to each transaction subsequently received by the second transaction receiver; and (f) means for posting the transactions received by the second transaction receiver in the second database and creating an audit trail of the posted transactions, the audit trail including the assigned transaction identifiers;

wherein the means for detecting detects selective transactions in the audit trail which have a transaction identifier similar to a preassigned transaction identifier stored in the audit trail, and the means for inhibiting inhibits the first database from posting to the first database selective transactions in the audit trail which were detected as having a transaction identifier similar to a preassigned transaction identifier stored in the audit trail.

50. A system according to claim 49 wherein the means for inhibiting prevents the second transaction transmitter from sending to the first database selective transactions in the audit trail which were detected as having a transaction identifier similar to a preassigned transaction identifier stored in the audit trail.

51. A system according to claim 49 wherein the preassigning and storing processes performed by the means for preassigning and means for storing are repeated whenever the transaction log has assigned all of the previously preassigned unique transaction identifiers, the audit trail thereby containing all of the preassigned transaction identifiers.

52. A system according to claim 36 wherein the bidirectional database replication system further includes (v) a second transaction receiver which receives transactions sent by the first transaction transmitter, (vi) a second processor which posts the transactions received by the second transaction receiver to the second database, the second processor including a second processor identifier, and (vii) an audit trail of all transactions posted to the second database, the system for selectively preventing transaction ping-pong further comprising:

(c) means for posting the transactions received by the second transaction receiver in the second database and creating an audit trail of the posted transactions, the audit trail including the second processor identifier, the means for posting being located in the second processor;

wherein the second transaction transmitter sends the transactions in the audit trail to the first database for posting to the first database, and wherein the means for detecting detects selective transactions which are in the audit trail of the second database and which include the second processor identifier, and the means for inhibiting comprises preventing the first database from posting selective transactions which were detected as being in the audit trail of the second database and which include the second processor identifier.

53. A system according to claim 52 wherein the means for inhibiting prevents the second transaction transmitter from sending to the first database selective transactions which are in the audit trail of the second database and which include the second processor identifier.

54. A system according to claim 52 further comprising:
(d) means for assigning a transaction identifier to every transaction received by the second transaction receiver which is posted to the second database, the transaction identifier including the second processor identifier; and
(e) means for storing the assigned transaction identifiers in the audit trail in association with the respective transactions, wherein the means for inhibiting prevents the first database from posting selective transactions which are in the audit trail of the second database and which include the second processor identifier as part of the transaction identifier.

55. A system according to claim 36 wherein the bidirectional database replication system further includes (v) a second transaction receiver which receives transactions sent by the first transaction transmitter, the second transaction receiver including a second transaction receiver identifier, and (vi) an audit trail of all transactions posted to the second database, the system for selectively preventing transaction ping-pong further comprising:
(c) means for posting the transactions received by the second transaction receiver in the second database and creating an audit trail of the posted transactions, the audit trail including the second transaction receiver identifier, wherein the second transaction transmitter sends the transactions in the audit trail to the first database for posting to the first database, and wherein the means for detecting detects selective transactions which are in the audit trail of the second database and which include the second transaction receiver identifier, and the means for inhibiting prevents the first database from posting selective transactions which were detected as being in the audit trail of the second database and which include the second transaction receiver identifier.

56. A system according to claim 55 wherein the means for inhibiting prevents the second transaction transmitter from sending to the first database selective transactions which are in the audit trail of the second database and which include the second transaction receiver identifier.

57. A system according to claim 55 wherein the system for selectively preventing transaction ping-pong further comprises:
(d) means for assigning a transaction identifier to every transaction received by the second transaction receiver which is posted to the second database, the transaction identifier including the second transaction receiver identifier; and
(e) means for storing the assigned transaction identifiers in the audit trail in association with the respective transactions, wherein the means for inhibiting prevents the first database from posting selective transactions which are in the audit trail of the second database and which include the second transaction receiver identifier as part of the transaction identifier.

58. A system according to claim 36 wherein the bidirectional database replication system further includes (v) an audit trail of all transactions posted to the second database, the audit trail including a first audit trail containing all transactions posted to the second database which were sent by the first transaction transmitter, and a second audit trail containing all transactions posted to the second database which were not sent by the first transaction transmitter, the system for selectively preventing transaction ping-pong further comprising:
(c) means for posting to the second database (i) all transactions sent by the first transaction transmitter and creating an audit trail of the posted transactions in the first audit trail, and (ii) all transactions not sent by the first transaction transmitter and creating an audit trail of the posted transactions in the second audit trail, wherein the second transaction transmitter sends the transactions in the audit trail to the first database for posting to the first database, and wherein the means for detecting comprises identifying selective transactions which are in the first audit trail of the second database, and the means for inhibiting prevents the first database from posting selective transactions which were identified as being in the first audit trail of the second database.

59. A system according to claim 58 wherein the bidirectional database replication system further includes (vi) a second transaction receiver which receives transactions sent by the first transaction transmitter and posts the transactions which it receives in the second database and creates an audit trail of the posted transactions in the first audit trail, and wherein the second transaction transmitter sends the transactions in the audit trail to the first database for posting to the first database, and wherein the means for inhibiting prevents the second transaction transmitter from sending to the first database selective transactions which are in the first audit trail of the second database.

60. A system according to claim 58 wherein the means for inhibiting prevents the second transaction transmitter from sending to the first database selective transactions which are in the first audit trail of the second database.

61. A system according to claim 58 wherein the audit trail is a single audit trail and the first and second audit trails are respective first and second parts of the single audit trail.

62. A system according to claim 36 wherein the bidirectional database replication system further includes (v) a second transaction receiver which receives transactions sent by the first transaction transmitter for posting to the second database, and (vi) an audit trail of all transactions posted to the second database, the system for selectively preventing transaction ping-pong further comprising:
(c) means for posting the transactions received by the second transaction receiver in the second database and creating an audit trail of the posted transactions; and (d) means for communicating the transactions received by the second transaction receiver to the second transaction transmitter, wherein the second transaction transmitter sends the transactions in the audit trail to the first database for posting to the first database, and wherein the means for detecting comprises detecting selective transactions in the audit trail which were communicated to the second transaction transmitter, and the means for inhibiting comprises preventing the second transaction transmitter from sending to the first database selective transactions in the audit trail which were detected as being communicated to the second transaction transmitter.

63. A system according to claim 36 wherein each of the transactions include transaction data which is usable to identify the origin of the transaction, the bidirectional database replication system further including (v) an audit trail of all transactions posted to the second database, and (vi) application code which interprets the transaction data within posted transactions for identifying the origin of the transaction, thereby identifying the originally posted database of the transaction, the system for selectively preventing transaction ping-pong firer comprising (c) means for posting to the second database selective transactions sent by the first transaction transmitter and creating an audit trail of the posted transactions, wherein the second transaction transmitter sends the transactions in the audit trail to the first database for posting to the first database; and (e) means for executing the application code on all transactions read out of the audit trail for sending to the first database, wherein the means for detecting uses the application code to identify selective transactions which originated at the first database, and the means for inhibiting prevents the first database from posting selective transactions which were identified by the application code as having originated at the first database.

64. A system according to claim 63 wherein the means for inhibiting prevents the second transaction transmitter from sending to the first database selective transactions which were identified by the application code as having originated at the first database.

65. A system according to claim 35 wherein each of the transactions include transaction data which is usable to identify the origin of the transaction, the bidirectional database replication system further including application code which interprets the transaction data within posted transactions for identifying the origin of the transaction, thereby identifying the originally posted database of the transaction, and the means for inhibiting inhibits the database at the local node from posting selective transactions which were detected as being originally sent by a node having a predetermined origin.

66. A system according to claim 34 wherein the inhibiting process is performed by a remote note which prevents the sending of any transactions to the local node which were detected as being originally sent by the local node to one or more remote nodes.

67. An article of manufacture comprising a computer usable medium having computer readable code means therein for selectively preventing transaction ping-pong in a bidirectional database replication system which includes a plurality of nodes connected via communication media in a topology, each node including a database and a transaction transmitter which sends transactions posted to the database to a database at one or more other nodes for replication in the databases of the one or more other nodes only after the transactions are actually posted to the database of the sending node, each transaction being one or more transaction steps or transaction operations, the computer readable program code means in the article of manufacture comprising:

(a) computer readable program code means for detecting all transactions to be posted to databases in remote nodes that were sent by a local node; and (b) computer readable program code means for inhibiting the database at the local node from posting selective transactions which were detected as being originally sent by the local node, wherein any transaction sent by a transaction transmitter of a node is replicated in the databases of the one or more other nodes only after the transaction is actually posted to the database of the sending node.

68. An article of manufacture according to claim 67 wherein the transactions are stored within transaction records, the transaction records including indicia of how many nodes the transaction has replicated to, and the computer readable program code means for inhibiting inhibits the database at the local node from posting selective transactions which were detected as being originally sent by the local node by virtue of having indicia that the transaction has replicated to a predetermined number of nodes.

69. An article of manufacture according to claim 68 wherein each of the transactions include transaction data which is usable to identify the origin of the transaction, the bidirectional database replication system further including application code which interprets the transaction data within posted transactions for identifying the origin of the transaction, thereby identifying the originally posted database of the transaction, and the computer readable program code means for inhibiting inhibits the database at the local node from posting selective transactions which were detected as being originally sent by a node having a predetermined origin.

70. An article of manufacture according to claim 67 wherein the inhibiting process is performed by a remote note which prevents the sending of any transactions to the local node which were detected as being originally sent by the local node to one or more remote nodes.

71. An article of manufacture comprising a computer usable medium having computer readable code means therein for selectively preventing transaction ping-pong in a bidirectional database replication system, the system including (i) a first database and (ii) a second database, the system further including (iii) a first transaction transmitter which sends transactions posted to the first database to the second database for replication in the second database, and (iv) a second transaction transmitter which sends transactions posted to the second database to the first database for replication in the first database only after the transactions are actually posted to the second database, each transaction being one or more transaction steps or transaction operations, the computer readable program code means in the article of manufacture comprising:

(a) computer readable program code means for detecting all transactions to be posted to the second database that were sent by the first transaction transmitter; and (b) computer readable program code means for inhibiting the first database from posting selective transactions which were detected as being originally sent by the first transaction transmitter, wherein any transaction sent by the second transaction transmitter is replicated in the first database only after the transaction is actually posted to the second database.

72. An article of manufacture according to claim 71 wherein the first database and the first transaction transmitter are at a first location, and the second database and the second transaction transmitter are at a second location remote from the first location, and the computer readable program code means for detecting is located at the second location.

73. An article of manufacture according to claim 71 wherein the computer readable program code means for inhibiting is located in the second transaction transmitter, thereby preventing the sending of selective transactions to the first database which were originally sent by the first transaction transmitter to the second database.

74. An article of manufacture according to claim 71 wherein the bidirectional database replication system further includes (v) a first transaction receiver which receives transactions sent by the second transaction transmitter for posting to the first database, and (vi) a second transaction receiver which receives transactions sent by the first transaction transmitter for posting to the second database, the computer readable program code means for inhibiting being located in the first transaction receiver.

75. An article of manufacture according to claim 74 wherein the first transaction transmitter is a first collector, the second transaction transmitter is a second collector, the first transaction receiver is a first consumer and the second transaction receiver is a second consumer.

76. An article of manufacture according to claim 71 wherein the first and second databases define respective first and second tables of the same database located in the same physical location and the system allows for replication to the same database.

77. An article of manufacture according to claim 71 wherein the first and second databases define respective first and second records of the same database located in the same physical location and the system allows for replication to the same database.

78. An article of manufacture according to claim 71 wherein the computer readable program code means for inhibiting inhibits the first database from posting all transactions which were detected as being originally sent by the first transaction transmitter.

79. An article of manufacture according to claim 71 wherein the computer readable code means in the article of manufacture further comprises:

(c) computer readable program code means for identifying transactions posted to the first database which should be returned to the first database for replication confirmation and transactions posted to the first database which should not be returned to the first database for replication confirmation, wherein the computer readable program code means for inhibiting inhibits the first database from posting only those transactions which were identified as those which should not be returned to the first database for replication confirmation.

80. An article of manufacture according to claim 79 wherein the first database includes indicia of replication confirmation for each transaction identified by the computer readable program code means for identifying for which replication confirmation is desired, wherein the computer readable code means in the article of manufacture further comprises:

(d) computer readable program code means for posting a change to the replication confirmation indicia when posting transactions which were identified as those which should be returned to the first database.

81. An article of manufacture according to claim 71 wherein the bidirectional database replication system further includes (v) a second transaction receiver which receives transactions sent by the first transaction transmitter for posting to the second database, (vi) a transaction log associated with the second database, and (vii) an audit trail of all transactions posted to the second database, the computer readable code means in the article of manufacture further comprising:

(c) computer readable program code means for assigning a transaction identifier to every transaction received by the second transaction receiver which is posted to the second database;

(d) computer readable program code means for posting the transactions received by second transaction receiver in the second database and creating an audit trail of the posted transactions; and (e) computer readable program code means for storing the assigned transaction identifiers in the transaction log and associating the assigned transaction identifiers with the transactions in the audit trail, wherein the second transaction transmitter sends the transactions in the audit trail for posting to the first database, and wherein the computer readable program code means for detecting detects selective transactions in the audit trail which have a transaction identifier similar to a transaction identifier in the transaction log, and the computer readable program code means for inhibiting inhibits the first database from posting to the first database selective transactions in the audit trail which were detected as having a transaction identifier similar to a transaction identifier in the transaction log.

82. An article of manufacture according to claim 81 wherein the computer readable program code means for inhibiting prevents the second transaction transmitter from sending to the first database selective transactions in the audit trail which were detected as having a transaction identifier similar to a transaction identifier in the transaction log.

83. An article of manufacture according to claim 82 wherein the bidirectional database replication system further includes (viii) a first transaction receiver which receives transactions sent by the second transaction transmitter for posting to the first database, (ix) a transaction log associated with the first database, and (x) an audit trail of all transactions posted to the first database, the first transaction transmitter sending the transactions in the audit trail of transactions posted to the first database for posting to the second database, the computer readable code means in the article of manufacture further comprising:

(f) computer readable program code means for assigning a transaction identifier to every transaction received by the first transaction receiver which is posted to the first database;

(g) computer readable program code means for posting the transactions received by first transaction receiver in the first database and creating an audit trail of the transactions posted to the first database;

(h) computer readable program code means for storing the assigned transaction identifiers in the transaction log associated with the first database and associating the transaction identifiers assigned by the computer readable program code means for assigning with the transactions in the audit trail of transactions posted to the first database;

(i) computer readable program code means for detecting all transactions to be posted to the first database that were sent by the second transaction transmitter; and (j) computer readable program code means for inhibiting the second database from posting selective transactions which were detected as being originally sent by the second transaction transmitter, wherein the computer readable program code means for detecting detects selective transactions in the audit trail of transactions posted to the first database which have a transaction identifier similar to a transaction identifier in the transaction log associated with the first database, and the computer readable program code means for inhibiting inhibits the second database from posting to the second database selective transactions in the audit trail of transactions posted to the first database which were detected as having a transaction identifier similar to a transaction identifier in the transaction log associated with the first database.

84. An article of manufacture according to claim 71 wherein the bidirectional database replication system further includes (v) a second transaction receiver which receives transactions sent by the first transaction transmitter for posting to the second database, (vi) a transaction log associated with the second database, and (vii) an audit trail of all transactions posted to the second database, the second transaction transmitter sending the transactions in the audit trail for posting to the first database, the computer readable code means in the article of manufacture further comprising:

(c) computer readable program code means for preassigning a block of unique transaction identifiers for transactions subsequently received by the second transaction receiver;

(d) computer readable program code means for storing the preassigned block of unique transaction identifiers in the audit trail and in the transaction log;

(e) computer readable program code means for assigning one of the preassigned unique transaction identifiers in the transaction log to each transaction subsequently received by the second transaction receiver; and (f) computer readable program code means for posting the transactions received by the second transaction receiver in the second database and creating an audit trail of the posted transactions, the audit trail including the assigned transaction identifiers;

wherein the computer readable program code means for detecting detects selective transactions in the audit trail which have a transaction identifier similar to a preassigned transaction identifier stored in the audit trail, and the computer readable program code means for inhibiting inhibits the first database from posting to the first database selective transactions in the audit trail which were detected as having a transaction identifier similar to a preassigned transaction identifier stored in the audit trail.

85. An article of manufacture according to claim 84 wherein the computer readable program code means for inhibiting prevents the second transaction transmitter from sending to the first database selective transactions in the audit trail which were detected as having a transaction identifier similar to a preassigned transaction identifier stored in the audit trail.

86. An article of manufacture according to claim 84 wherein the preassigning and storing processes performed by the computer readable program code means for preassigning and computer readable program code means for storing are repeated whenever the transaction log has assigned all of the previously preassigned unique transaction identifiers, the audit trail thereby containing all of the preassigned transaction identifiers.

87. An article of manufacture according to claim 71 wherein the bidirectional database replication system further includes (v) a second transaction receiver which receives transactions sent by the first transaction transmitter, (vi) a second processor which posts the transactions received by the second transaction receiver to the second database, the second processor including a second processor identifier, and (vii) an audit trail of all transactions posted to the second database, the computer readable code means in the article of manufacture further comprising:

(c) computer readable program code means for posting the transactions received by the second transaction receiver in the second database and creating an audit trail of the posted transactions, the audit trail including the second processor identifier, the computer readable program code means for posting being located in the second processor;

wherein the second transaction transmitter sends the transactions in the audit trail to the first database for posting to the first database, and wherein the computer readable program code means for detecting detects selective transactions which are in the audit trail of the second database and which include the second processor identifier, and the computer readable program code means for inhibiting comprises preventing the first database from posting selective transactions which were detected as being in the audit trail of the second database and which include the second processor identifier.

88. An article of manufacture according to claim 87 wherein the computer readable program code means for inhibiting prevents the second transaction transmitter from sending to the first database selective transactions which are in the audit trail of the second database and which include the second processor identifier.

89. An article of manufacture according to claim 87 further comprising:

(d) computer readable program code means for assigning a transaction identifier to every transaction received by the second transaction receiver which is posted to the second database, the transaction identifier including the second processor identifier; and (e) computer readable program code means for storing the assigned transaction identifiers in the audit trail in association with the respective transactions, wherein the computer readable program code means for inhibiting prevents the first database from posting selective transactions which are in the audit trail of the second database and which include the second processor identifier as part of the transaction identifier.

90. An article of manufacture according to claim 71 wherein the bidirectional database replication system further includes (v) a second transaction receiver which receives transactions sent by the first transaction transmitter, the second transaction receiver including a second transaction receiver identifier, and (vi) an audit trail of all transactions posted to the second database, the computer readable code means in the article of manufacture further comprising:

(c) computer readable program code means for posting the transactions received by the second transaction receiver in the second database and creating an audit trail of the posted transactions, the audit trail including the second transaction receiver identifier, wherein the second transaction transmitter sends the transactions in the audit trail to the first database for posting to the first database, and wherein the computer readable program code means for detecting detects selective transactions which are in the audit trail of the second database and which include the second transaction receiver identifier, and the computer readable program code means for inhibiting prevents the first database from posting selective transactions which were detected as being in the audit trail of the second database and which include the second transaction receiver identifier.

91. An article of manufacture according to claim 90 wherein the computer readable program code means for inhibiting prevents the second transaction transmitter from sending to the first database selective transactions which are in the audit trail of the second database and which include the second transaction receiver identifier.

92. An article of manufacture according to claim 90 further comprising:

(d) computer readable program code means for assigning a transaction identifier to every transaction received by the second transaction receiver which is posted to the second database, the transaction identifier including the second transaction receiver identifier; and (e) computer readable program code means for storing the assigned transaction identifiers in the audit trail in association with the respective transactions, wherein the computer readable program code means for inhibiting prevents the first database from posting selective transactions which are in the audit trail of the second database and which include the second transaction receiver identifier as part of the transaction identifier.

93. An article of manufacture according to claim 71 wherein the bidirectional database replication system further includes (v) an audit trail of all transactions posted to the second database, the audit trail including a first audit trail containing all transactions posted to the second database which were sent by the first transaction transmitter, and a second audit trail containing all transactions posted to the second database which were not sent by the first transaction transmitter, the computer readable code means in the article of manufacture further comprising:

(c) computer readable program code means for posting to the second database (i) all transactions sent by the first transaction transmitter and creating an audit trail of the posted transactions in the first audit trail, and (ii) all transactions not sent by the first transaction transmitter and creating an audit trail of the posted transactions in the second audit trail, wherein the second transaction transmitter sends the transactions in the audit trail to the first database for posting to the first database, and wherein the computer readable program code means for detecting comprises identifying selective transactions which are in the first audit trail of the second database, and the computer readable program code means for inhibiting prevents the first database from posting selective transactions which were identified as being in the first audit trail of the second database.

94. An article of manufacture according to claim 93 wherein the bidirectional database replication system further includes (vi) a second transaction receiver which receives transactions sent by the first transaction transmitter and posts the transactions which it receives in the second database and creates an audit trail of the posted transactions in the first audit trail, and wherein the second transaction transmitter sends the transactions in the audit trail to the first database for posting to the first database, and wherein the computer readable program code means for inhibiting prevents the second transaction transmitter from sending to the first database selective transactions which are in the first audit trail of the second database.

95. An article of manufacture according to claim 93 wherein the computer readable program code means for inhibiting prevents the second transaction transmitter from sending to the first database selective transactions which are in the first audit trail of the second database.

96. An article of manufacture according to claim 93 wherein the audit trail is a single audit trail and the first and second audit trails are respective first and second parts of the single audit trail.

97. An article of manufacture according to claim 71 wherein the bidirectional database replication system further includes (v) a second transaction receiver which receives transactions sent by the first transaction transmitter for posting to the second database, and (vi) an audit trail of all transactions posted to the second database, the computer readable code means in the article of manufacture further comprising:

(c) computer readable program code means for posting the transactions received by the second transaction receiver in the second database and creating an audit trail of the posted transactions; and (d) computer readable program code means for communicating the transactions received by the second transaction receiver to the second transaction transmitter, wherein the second transaction transmitter sends the transactions in the audit trail to the first database for posting to the first database, and wherein the computer readable program code means for detecting comprises detecting selective transactions in the audit trail which were communicated to the second transaction transmitter, and the computer readable program code means for inhibiting comprises preventing the second transaction transmitter from sending to the first database selective transactions in the audit trail which were detected as being communicated to the second transaction transmitter.

98. An article of manufacture according to claim 71 wherein each of the transactions include transaction data which is usable to identify the origin of the transaction, the bidirectional database replication system further including (v) an audit trail of all transactions posted to the second database, and (vi) application code which interprets the transaction data within posted transactions for identifying the origin of the transaction, thereby identifying the originally posted database of the transaction, the computer readable code means in the article of manufacture further comprising:

(c) computer readable program code means for posting to the second database selective transactions sent by the first transaction transmitter and creating an audit trail of the posted transactions, wherein the second transaction transmitter sends the transactions in the audit trail to the first database for posting to the first database; and (e) computer readable program code means for executing the application code on all transactions read out of the audit trail for sending to the first database, wherein the computer readable program code means for detecting uses the application code to identify selective transactions which originated at the first database, and the computer readable program code means for inhibiting prevents the first database from posting selective transactions which were identified by the application code as having originated at the first database.

99. An article of manufacture according to claim 98 wherein the computer readable program code means for inhibiting prevents the second transaction transmitter from sending to the first database selective transactions which were identified by the application code as having originated at the first database.

* * * * *